(12) United States Patent
Mir

(10) Patent No.: US 10,136,757 B2
(45) Date of Patent: *Nov. 27, 2018

(54) PACKAGING MATERIAL FOR COOKING FOOD

(71) Applicant: Mirtech, Inc., Somerset, NJ (US)

(72) Inventor: Nazir Mir, Somerset, NJ (US)

(73) Assignee: Mirtech, Inc., Somerset, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/451,389

(22) Filed: Mar. 6, 2017

(65) Prior Publication Data

US 2017/0303738 A1    Oct. 26, 2017

Related U.S. Application Data

(60) Continuation of application No. 13/373,892, filed on Dec. 5, 2011, now Pat. No. 9,585,515, which is a division of application No. 11/604,606, filed on Nov. 27, 2006, now Pat. No. 8,087,827, which is a continuation-in-part of application No.
(Continued)

(51) Int. Cl.
*B65D 33/01* (2006.01)
*A47J 36/02* (2006.01)
*B65D 81/20* (2006.01)
*B32B 3/26* (2006.01)
(Continued)

(52) U.S. Cl.
CPC .............. *A47J 36/027* (2013.01); *B32B 3/266* (2013.01); *B65D 33/01* (2013.01); *B65D 81/2084* (2013.01); *B65D 81/34* (2013.01); *B65D 85/34* (2013.01); *B65D 2205/02* (2013.01); *Y10T 428/24322* (2015.01)

(58) Field of Classification Search
CPC ........ A47J 36/027; B32B 3/266; B65D 33/01; B65D 81/2084; B65D 81/34; B65D 85/34; B65D 2205/02
USPC .......................................................... 383/102
See application file for complete search history.

(56) References Cited

U.S. PATENT DOCUMENTS 3,012,895 A    12/1961    Stelnicki
3,085,608 A    4/1963    Mathues
(Continued)

FOREIGN PATENT DOCUMENTS

CH    515150    11/1971
EP    0490558    6/1992
(Continued)

OTHER PUBLICATIONS

US PTO, Office Action dated Mar. 3, 2008, U.S. Appl. No. 10/855,305.
(Continued)

*Primary Examiner* — Jes F Pascua
(74) *Attorney, Agent, or Firm* — Maceiko IP

(57) ABSTRACT

A packaging device allowing for the distribution, storage and cooking of various food products, such as perishable or frozen food product(s). The packaging device includes a plurality of micro-perforations that may promote the extended shelf-life of the perishable food product and the maintenance of the quality of the perishable food product or be configured to maintain the integrity of a frozen food product. The packaging device also includes a venting system that allows the cooking of the perishable or frozen food products within the packaging device.

20 Claims, 21 Drawing Sheets

Related U.S. Application Data

PCT/US2005/018740, filed on May 27, 2005, which is a continuation-in-part of application No. 10/855,305, filed on May 27, 2004.

(60) Provisional application No. 60/630,379, filed on Nov. 23, 2004.

(51) Int. Cl.
*B65D 81/34* (2006.01)
*B65D 85/34* (2006.01)

(56) References Cited

U.S. PATENT DOCUMENTS

| | | |
|---|---|---|
| 3,399,822 A | 9/1968 | Kugler |
| 3,450,542 A | 6/1969 | Badran |
| 3,450,543 A | 6/1969 | Badran et al. |
| 3,450,544 A | 6/1969 | Badran et al. |
| 3,552,637 A | 1/1971 | Swinford |
| 3,798,333 A | 3/1974 | Cummin |
| 4,515,266 A | 5/1985 | Myers |
| 4,866,786 A | 9/1989 | Nagler |
| 4,886,372 A | 12/1989 | Greengrass et al. |
| 4,954,356 A | 9/1990 | Kappes |
| 5,171,593 A | 12/1992 | Doyle |
| 5,226,735 A | 7/1993 | Beliveau |
| 5,458,899 A | 10/1995 | Floyd et al. |
| 5,492,705 A | 2/1996 | Porchia et al. |
| 5,505,950 A | 4/1996 | Floyd et al. |
| 5,556,658 A | 9/1996 | Raudalus et al. |
| 5,565,230 A | 10/1996 | Bailey |
| 5,617,711 A | 4/1997 | Rodriguez et al. |
| 5,655,842 A | 8/1997 | Hagino |
| 5,672,406 A | 9/1997 | Challis et al. |
| 5,698,249 A | 12/1997 | Hayashi et al. |
| 5,839,832 A | 11/1998 | Hagino |
| 5,919,504 A | 7/1999 | Muise et al. |
| 6,013,293 A | 1/2000 | DeMoor |
| 6,068,898 A | 5/2000 | Oyama |
| 6,183,789 B1 | 2/2001 | Nilsson et al. |
| 6,190,710 B1 | 2/2001 | Nir et al. |
| 6,391,357 B1 | 5/2002 | Muise et al. |
| 6,441,340 B1 | 8/2002 | Varriano-Marston |
| 6,461,702 B2 | 10/2002 | Gong |
| 6,730,874 B2 | 5/2004 | Varriano-Marston |
| 7,077,923 B2 | 7/2006 | Lin |
| 7,083,837 B1 | 8/2006 | Varriano-Marston |
| 7,323,669 B2 | 1/2008 | Robison et al. |
| 7,723,656 B1 | 5/2010 | Angelos |
| 8,087,827 B2 | 1/2012 | Mir |
| 8,112,974 B1 | 2/2012 | Angelos |
| 9,016,944 B2 | 4/2015 | Mir |
| 9,585,515 B2 | 3/2017 | Mir |
| 2001/0012530 A1 | 8/2001 | Hiyoshi |
| 2002/0090425 A1 | 7/2002 | Clarke |
| 2002/0127305 A1 | 9/2002 | Clarke |
| 2002/0133850 A1 | 9/2002 | Clendennen et al. |
| 2003/0029850 A1 | 2/2003 | Varriano-Marston |
| 2003/0059128 A1 | 3/2003 | Vangedal-Nielsen |
| 2003/0123758 A1 | 7/2003 | Mita et al. |
| 2004/0103989 A1 | 6/2004 | Lin |
| 2004/0191476 A1 | 9/2004 | Wallen et al. |
| 2005/0180664 A1 | 8/2005 | Yamada |
| 2005/0266129 A1 | 12/2005 | Mir |
| 2005/0269386 A1 | 12/2005 | Fisher et al. |
| 2006/0003146 A1 | 1/2006 | Hanspeter |
| 2006/0165958 A1 | 7/2006 | Sankey et al. |
| 2006/0257056 A1 | 11/2006 | Miyake et al. |
| 2008/0056624 A1 | 3/2008 | Chudley |
| 2009/0029082 A1 | 1/2009 | Remmele et al. |

FOREIGN PATENT DOCUMENTS

| | | |
|---|---|---|
| EP | 0661219 | 7/1995 |
| EP | 1033324 | 9/2000 |
| EP | 1707348 | 10/2006 |
| GB | 2221692 | 2/1990 |
| JP | 09095367 | 4/1997 |
| JP | 09252718 | 9/1997 |
| JP | 09267870 | 10/1997 |
| JP | 10042800 | 2/1998 |
| JP | 10152177 | 6/1998 |
| JP | 10179076 | 7/1998 |
| JP | 11278557 | 10/1999 |
| JP | 2000025850 | 1/2000 |
| JP | 2000335657 | 12/2000 |
| JP | 2001180764 | 7/2001 |
| JP | 2002029574 | 1/2002 |
| JP | 2002080070 | 3/2002 |
| JP | 2002080073 | 3/2002 |
| JP | 2002249177 | 9/2002 |
| JP | 2004016134 | 1/2004 |
| JP | 2005047584 | 2/2005 |
| JP | 2006001577 | 1/2006 |
| WO | WO 1993/022207 | 11/1993 |
| WO | WO 2001/092118 | 12/2001 |
| WO | WO 2005/118770 A2 | 12/2005 |
| WO | WO 2005/118770 A3 | 12/2005 |
| WO | WO 2006-034737 | 4/2006 |
| WO | WO 2006-034793 | 4/2006 |

OTHER PUBLICATIONS

US PTO, Office Action dated Nov. 25, 2008, U.S. Appl. No. 10/855,305.
US PTO, Office Action dated Oct. 16, 2009, U.S. Appl. No. 10/855,305.
US PTO, Office Action dated Jul. 16, 2010, U.S. Appl. No. 11/604,606.
US PTO, Office Action dated Mar. 24, 2011, U.S. Appl. No. 11/604,606.
US PTO, Office Action dated Apr. 4, 2011, U.S. Appl. No. 10/855,305.
Varriano-Marston, Product Marketing Almanac 1987, pp. 23, 25, 27, 29.
Varriano-Marston, E. and Wust, Jr., C.J., "Controlled Atmosphere Packaging of Product," 1987 Produce Marketing Almanac, pp. 23, 25, 27, 29.
Veeraju, P. and Karel, M., "Controlling Atmosphere in a Fresh-Fruit Package," Modern Packaging, 40, #2, 1966.
Zagory, Devon and Kader, Adel A., "Modified Atmosphere Packaging of Fresh Produce," Food Technology, Sep. 1988, pp. 70-74, 76.
Machine Translation of the Description of JP 09252718 A.
Machine Translation of the Description of JP 2004016134 A.
Marcellin, P., "Storage of Fruits and Vegetables in Controlled Atmosphere Using Polymer Membranes," Revue Generale du Froid, No. 3, Mar. 1974, pp. 217-236.
Palmer, J.K., "The Banana," The Biochemistry of Fruits and their Products, vol. 2, pp. 65-105 (Academic Press, London and New York, 1971).
PCT, International Preliminary Report on Patentability and Written Opinion of the International Searching Authority dated Aug. 14, 2006, International Patent Application No. PCT/US05/18740.
PCT, International Search Report, dated Aug. 14, 2006, International Patent Application No. PCT/US05/18740, 2 pages.
Rizvi, S.S.H., PhD., "Principles of Microatmosphere Packaging," Proceedings of the International Conference on Controlled Atmosphere Packaging, pp. cover, 135-150, Oct. 29, 1984.
US PTO, Notice of Allowance and Fee(s) Due, dated Nov. 10, 2011, U.S. Appl. No. 11/604,606.
US PTO, Office Action dated Jun. 8, 2007, U.S. Appl. No. 10/855,305.
Australian Examiner's Report dated Nov. 11, 2009, Application No. 2005250421.
Canadian Examiner's Requisiton dated Sep. 8, 2009, Application No. 2,567,898.
Canadian Examiner's Requisition dated Jun. 8, 2011, Application No. 2,567,898.
Canadian Examiner's Requisition dated Feb. 20, 2012, Application No. 2,567,898.

(56) References Cited

OTHER PUBLICATIONS

European Examination Report Dated Dec. 12, 2009.
Indian Examination Report dated Jul. 23, 2010, Application No. 3930/KOLNP/2006.
Irving, A.R., "Transport of Fresh Horticultural Produce Under Modified Atmospheres," CSIRO Food Res. Q. 44, 2, pp. 25-33, 1984.
Machine Translation of JP 09-095367; translated on Jul. 16, 2012.
Machine Translation of JP 2001-180764A; translated on Jul. 16, 2010.
Machine Translation of JP 2002-80070; translated on Jun. 30, 2010.

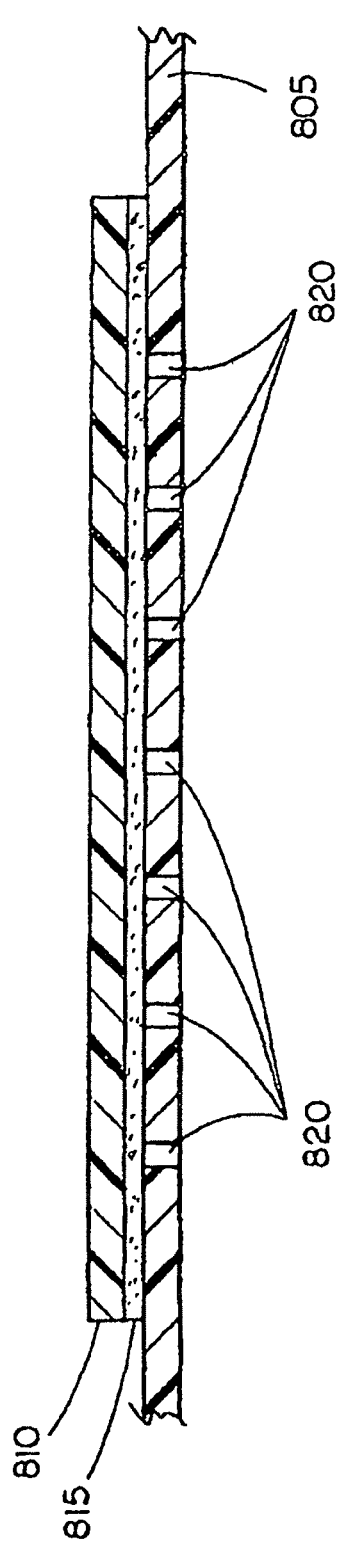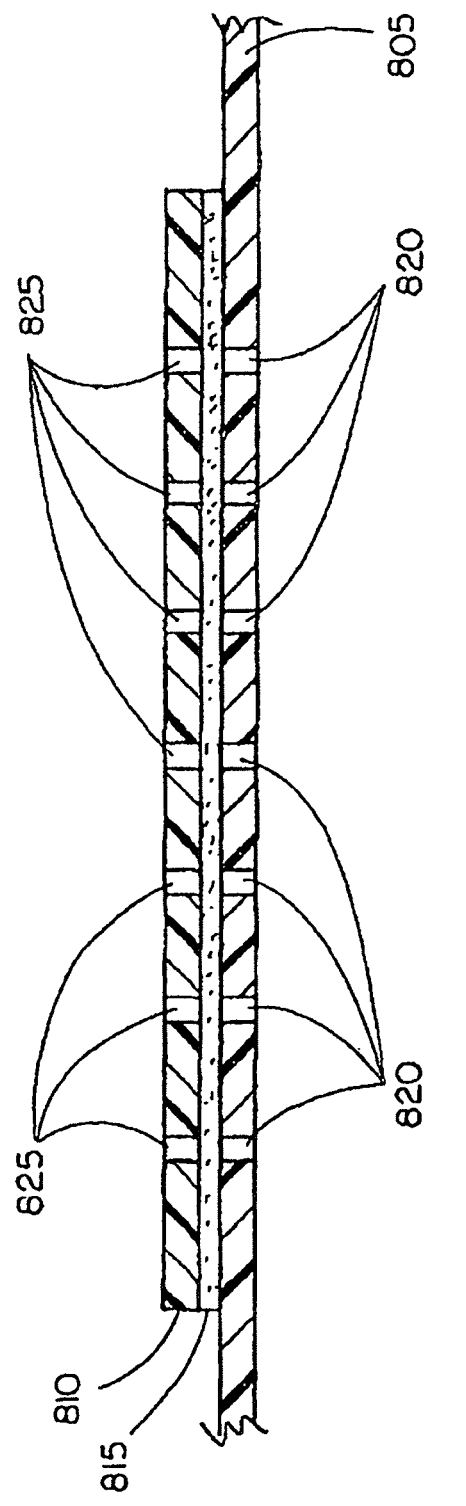
FIG. 12
FIG. 13

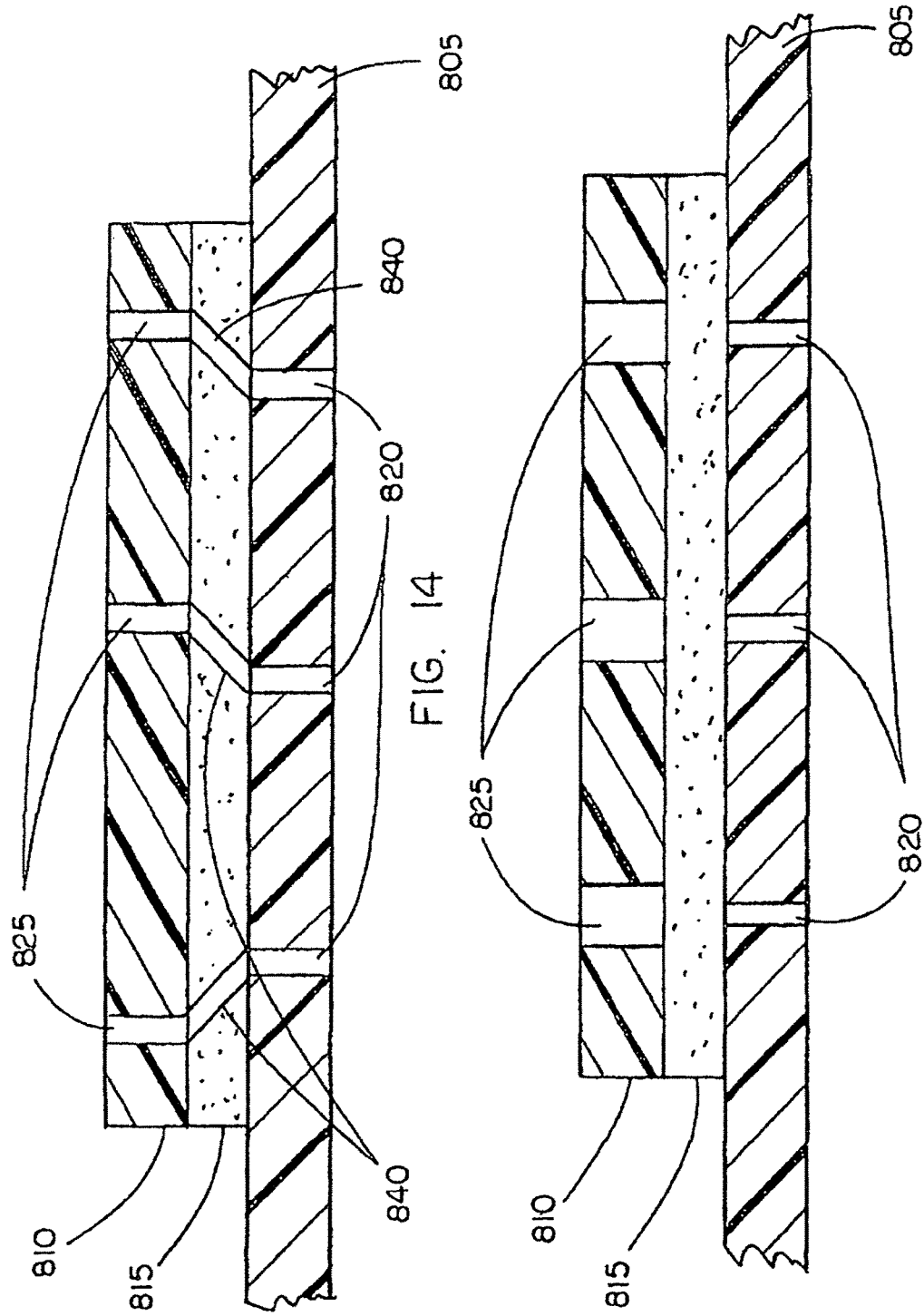

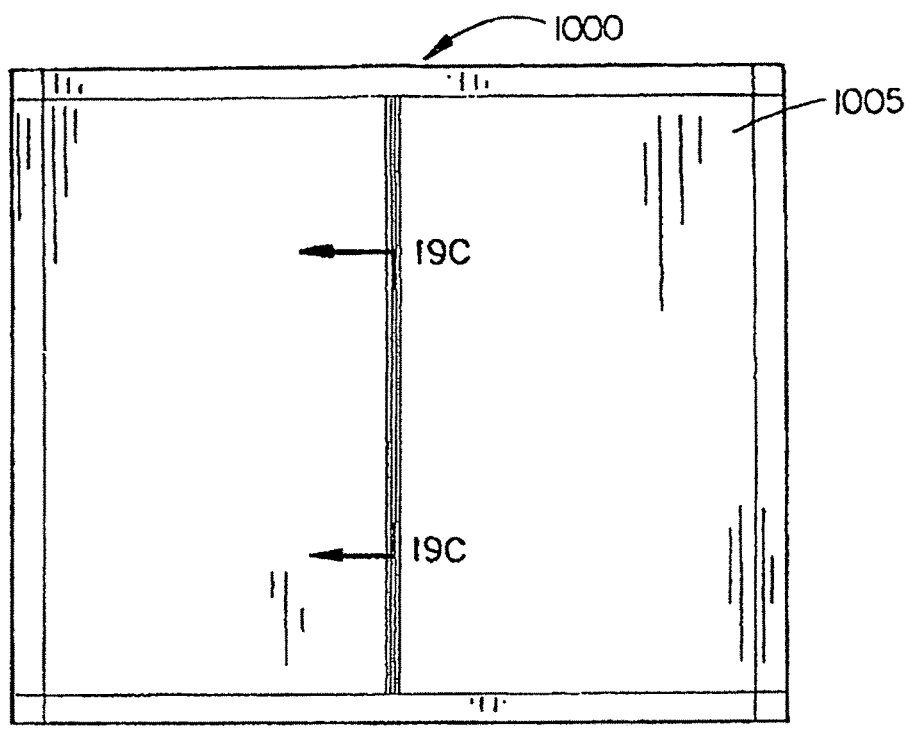
FIG. 19A
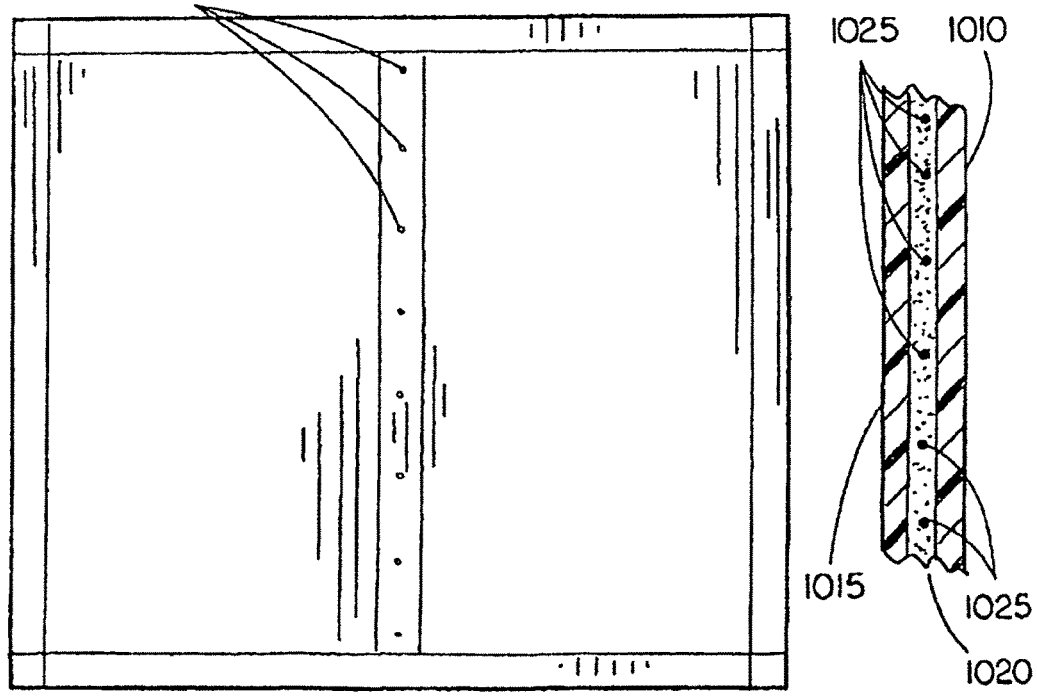
FIG. 19B
FIG. 19C

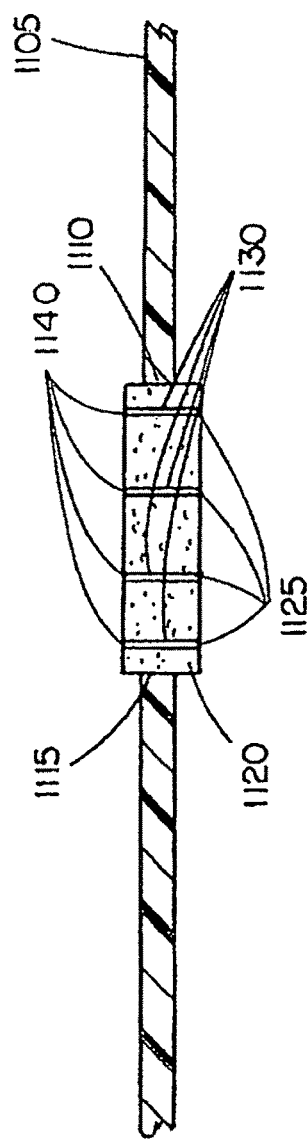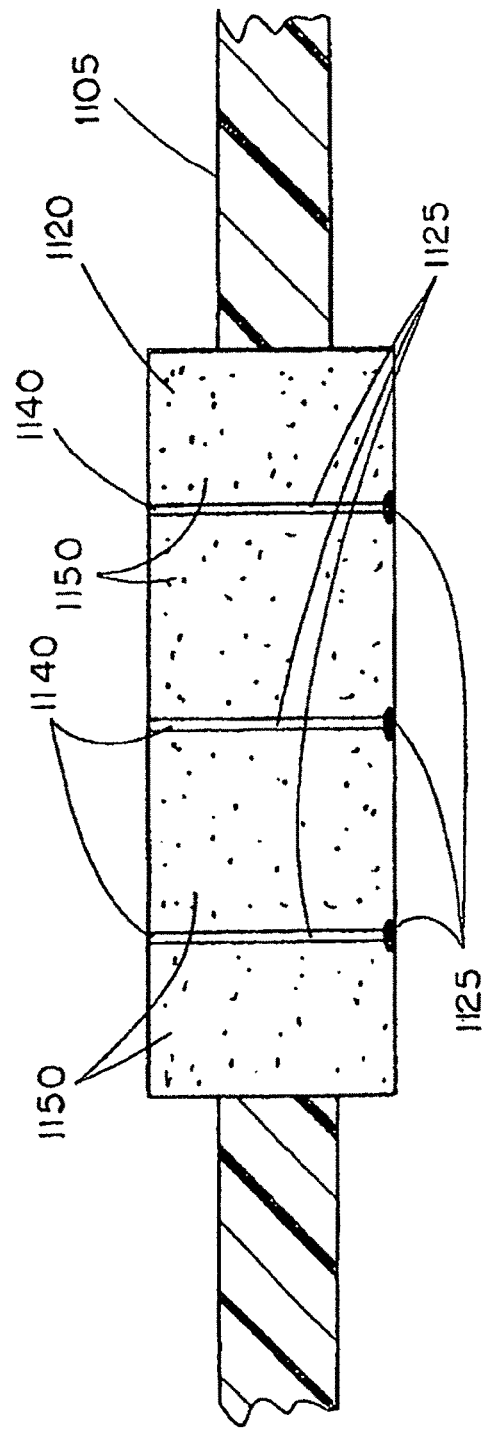

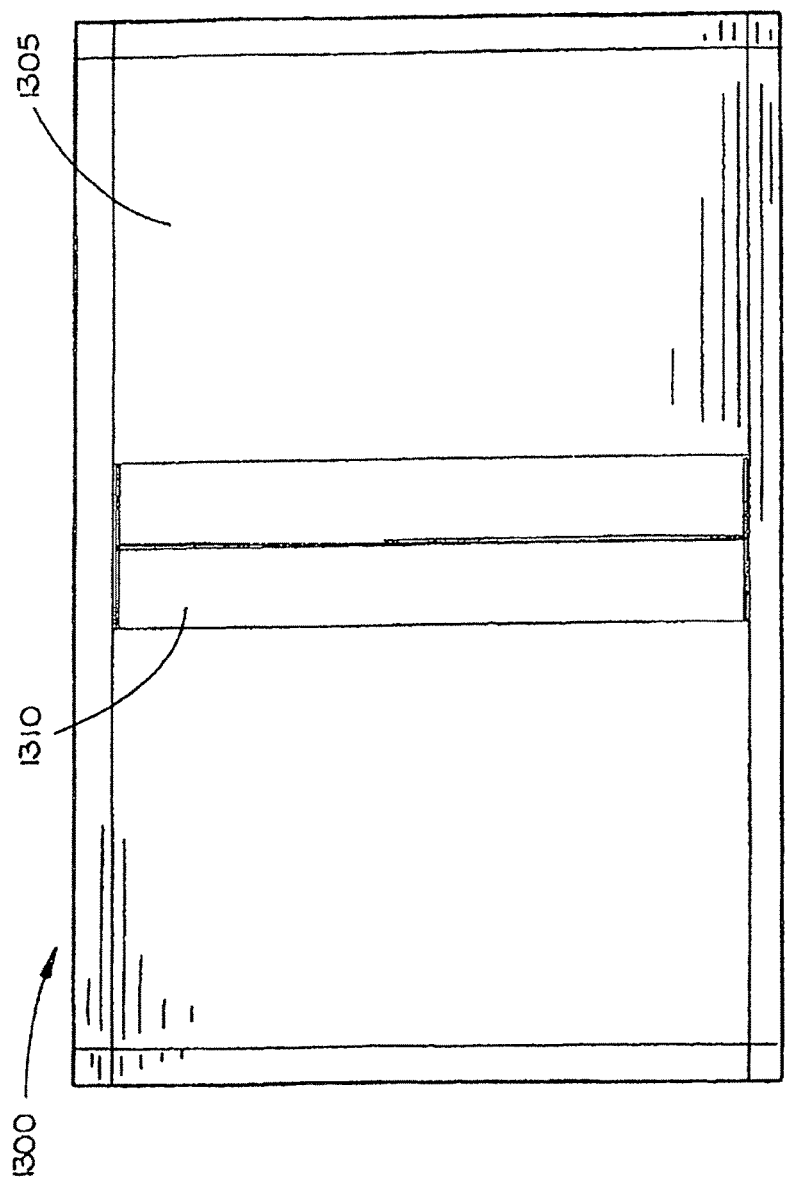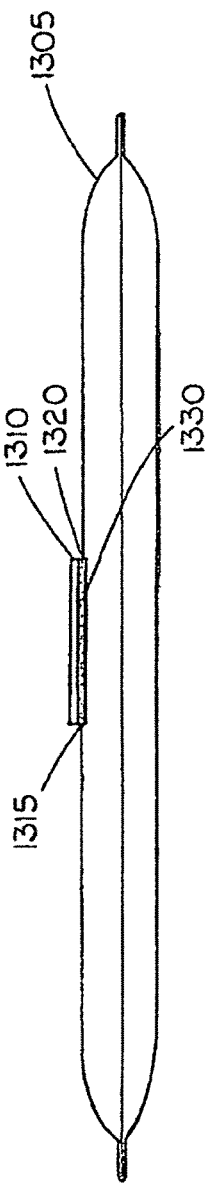
FIG. 22A
FIG. 22B

PACKAGING MATERIAL FOR COOKING FOOD

CROSS REFERENCE TO RELATED APPLICATION

This application is a continuation of U.S. application Ser. No. 13/373,892, filed Dec. 5, 2011, which will issue as U.S. Pat. No. 9,585,515 on Mar. 7, 2017, which is a divisional of U.S. application Ser. No. 11/604,606, filed Nov. 27, 2006, now U.S. Pat. No. 8,087,827, which is a continuation-in-part application of PCT Application Serial No. PCT/US2005/018740, filed on May 27, 2005, which claims priority to U.S. Provisional Patent Application Ser. No. 60/630,379, filed on Nov. 23, 2004 and U.S. application Ser. No. 10/855,305, filed on May 27, 2004. The foregoing applications are incorporated by reference as if fully set forth herein.

FIELD OF THE INVENTION

The present invention generally relates to the field of packaging for perishable food products, and particularly to a package and method of packaging perishable food products which optimizes the food product life, provides the food product in a ready to eat form, and allows for cooking of the food product.

BACKGROUND OF THE INVENTION

Fruits and vegetables have been receiving considerable attention as consumers become more health conscious. Health benefits associated with regular consumption of fresh fruits and vegetables such as blueberries, cranberries, strawberries, apple, carrots, broccoli and tomato are generally well recognized (Djuric and Powell, 2001; Kays, 2001).

Health conscious consumers are increasingly spending more on fresh produce, and are buying new value-added fresh-produce products (Dim itri et al., 2004). Value-added fresh-produce products include fresh-cut fruits and vegetables, such as carrots, broccoli, cauliflower, com, leafy greens, strawberries, blueberries, apple, grapes, cranberries, etc., which are offered for sale in a pre-packaged form. This type of value-added benefit, which provides the product in a Ready-to-Eat form, may allow the product to be cooked while still within the package and/or allow the product to be distributed and stored in various Ready-to-Eat forms, such as pre-packaged salads, pre-packaged baby carrots, pre-packaged strawberries, and the like.

The US produce market is estimated at about $88 billion and these value-added products comprise the most rapidly growing segment of the fresh produce industry as well as one of the most rapidly growing categories in the supermarket and food service markets. This growth is evidenced by facts, such as that the consumption of value-added produce has increased from $82 million in 1989 to $10 billion in 2003 (Center for Nutrition Policy and Promotion) accounting for over 10% of produce sales. The value-added segment of the US produce market is expected to reach approximately $25 billion over the next five years, with the food service market alone accounting for 20% or $5 billion. Fast food restaurants, supermarket chains, and food service brokers are expected to fuel the continued growth of this market sector.

One of the major factors contributing to successfully increasing consumption of fruit and vegetables is delivering products with good quality. Efforts to maintain the quality of lightly processed perishable products (fresh fruit and vegetables) throughout the processes of distribution and storage has focused on modifying or controlling the internal atmospheric environment provided by the packages within which these products are distributed and stored. The atmospheric modification which takes place in packages may be dependent upon several variables such as permeability of the material of the package, respiration rate of the perishable product and temperature during distribution and storage. Currently, there are techniques which attempt to modify or control the atmosphere within the package(s) containing these products. Typically, these controlled atmosphere packaging devices utilize regimes similar to those of controlled-atmosphere storage. Unfortunately, these controlled-atmosphere regimes may not provide optimal atmospheric conditions within the package for the various products during their distribution and storage, which may result in premature fermentation (degradation) of the product within. This premature fermentation may result in decreased shelf-life of the perishable food products, which in turn may result in decreased sales of the products.

Further, the current modified atmosphere technology may not allow for the food product to develop to a desired ripeness, providing a certain aesthetic, in a time sensitive manner and then be maintained at the desired ripeness for a prolonged period of time. For instance, the distribution and storage of bananas is influenced by a color scale from 3 to 6. At a desired ripeness the bananas are typically at 3-4 on the color scale presenting an aesthetic of a yellow banana peel with few or no discolorations. The discolorations are indicative of the degradation of the banana fruit and as they increase in appearance, the sale of such bananas may decrease. Bananas are typically distributed and stored in packaging devices, therefore having a packaging device able to assist in prolonging the banana fruit at the desired ripeness indicated by a color appearance of 3-6 would be desirable.

The Ready-to-Eat packaging devices mentioned above may provide a simplified meal alternative or may allow for the cooking of the produce within. Current technology provides packaging devices which allow the package, including the product within, to be steam cooked, such as within a microwave oven. Unfortunately, this type of packaging may not employ any modified atmosphere capabilities or simply employ those which are currently known and do not optimize product life. Therefore, fermentation (degradation) of the food product may result after a shortened product life making the product aesthetically undesirable, possibly nutritionally compromised and possibly unsafe to eat from a microbiological standpoint.

U.S. Published Patent Application No. 0012530 A1 describes a microwave heating/cooking method for a packaged cooked food stored in water or aqueous medium utilizing holes (>5,000µ) covered with heat sensitive adhesive. During microwave heating, the adhesive falls apart, thereby, allowing the steam formed from water or the aqueous medium of the packaged food to exit through the holes. However, the key criterion for this package to work is that food needs to be packaged in water medium and the package has to be airtight to avoid any leaks. Such configuration restricts the use of this package only to products containing added water. In addition, the airtight nature of the package will make the use of that technique inapplicable to products having breathability requirements.

U.S. Pat. No. 6,730,874 B2 discloses a method for drilling holes through packaging materials for produce applications. The use of perforations for controlling the gas exchange of non-microwaveable packaging materials is based on the concept that thickness of the film played no role in influencing the gas exchange of the non-microwavable film. Thus, the method of making and use of perforations as described in the above patent are not applicable to microwavable films.

Therefore it would be desirable to provide a packaging device and method of packaging food products, such food products possibly having breathability requirements or not, that allows produce and other food contents of the package to maintain excellent quality and shelf life during distribution and may also allow the packaged food products to be cooked (i.e., steam cooked) while in the packaging device, allowing maximum quality and nutrient retention.

SUMMARY OF THE INVENTION

Accordingly, in a particularly preferred embodiment, the present invention provides a packaging device for fresh produce, such as fruits and vegetables which provide low oxygen and high carbon dioxide regimes, which are able to maintain desired atmospheric conditions within the package throughout the distribution and storage of the fresh produce within the package. In a further preferred embodiment of the present invention, a packaging device, modified atmosphere packaging (MAP), is provided. The packaging device provides for the enclosure of food products, such as fresh produce, in polymeric films in which the gaseous environment is actively or passively altered due to the presence of micro-perforations to slow respiration, reduce decay (inhibit fermentation), and/or extend the shelf life of the food products. It was discovered by the inventors of the instant application that the gas exchange performance of the perforation may be highly compromised if the diameter of the perforation was less than the thickness of the microwavable film. The present invention may employ the packaging device for use with various food products, such as meat products, that may be stored alone in the packaging device or in combination with various other food products (i.e., produce).

The present invention may provide a packaging device including micro-perforations that promote the cooking of a perishable food product while stored within the packaging device. The micro-perforations, of the present invention, included within the packaging device do not substantially alter the cooking properties of the packaging device.

The present invention may assist in increasing the ease of use of the food product, such that the food product is ready for use (Ready-to-Eat) upon delivery. The ready for use aspect of the present invention allows the presentation of food products in a form that provides a consumer of the food product the ability to consume the food product directly from the package or to heat and/or cook the food product within the package. In addition, the present invention may provide less waste at a food service location as the deliverable food product may be portioned for use. Providing for flexibility and customizability of packaging upon demand by a consumer is another advantage of the present invention.

With respect to the food service industry the present invention may assist in promoting the ease of use of the food product, by process employees (people who prepare the food product), as the food product provided within the packaging device may not require preparations, such as slicing, cutting, or washing of the food products before the food product may be transferred to another container for cooking. Additionally, the present invention may allow for increased integration of other menu items (food products) emphasizing alternative food options.

In a further exemplary embodiment of the current invention, a packaging device provides for the storage of various frozen food products and the cooking of these various frozen food products while contained within the packaging device. These packaging devices include a venting system that allow for the cooking of the food product but also allow the food product to be stored in a frozen state.

In an exemplary embodiment of the current invention, a method of cooking a food product, is provided. The method includes selecting a food product contained within a packaging device including a venting system contained within a base film. In a next step, cooking the food product while contained within the packaging device is accomplished. The venting system allows the release of pressure build-up during a cooking process.

The venting system may be included within the base film of the packaging device or within a region of the base film wherein the base film is bonded to form the packaging device. In an exemplary embodiment of the current invention, the packaging device includes a second base film that bonds with the first base film. The bonding of the second base film is in an area that allows the second base film to cover the venting system. It is to be understood that the position of the venting system and the bonding of the second base film may vary and be located about the first base film. The venting system may include micro-perforations that may be covered by adhesive or included within an adhesive seal that bonds edges of a base film to form the packaging device. These micro-perforations may be configured in an open position to allow for the storage of perishable food products or in a closed position to allow for the storage of frozen food products.

In an exemplary embodiment off the current invention the venting system includes a plurality of micro-perforations which are steam release valve micro-perforations. The steam release valve micro-perforations are sensitive to temperature and pressure build-up within the packaging device during the cooking process. The steam release valve micro-perforations allow for the release of steam during the cooking process through a process of expansion of the size of the micro-perforations. The steam release valve micro-perforations may be employed with packaging devices storing perishable or frozen food products.

It is to be understood that both the foregoing general description and the following detailed description are exemplary and explanatory only and are not restrictive of the invention.

BRIEF DESCRIPTION OF THE DRAWINGS

FIG. 12 is a cross-section of the two base films as shown on FIGS. 10 and 11, showing the placement of the micro-perforations on the first base film.

FIG. 13 is a cross-section of the two base films as shown on FIGS. 10 and 11, showing the placement of the micro-perforations on both base films.

FIG. 14 is a cross-section of the two base films as shown on FIG. 13, where the micro-perforations on the first base film are not aligned directly with the micro-perforations of the second base film.

FIG. 15 is a cross-section of the two base films as shown on FIG. 13, where the micro-perforations on the first base film are of different diameter than the micro-perforations of the second base film.

FIGS. 19A and 19B are isometric illustrations of a packaging device including micro-perforations in accordance with an exemplary embodiment of the present invention and providing a venting system that allows for cooking a food product in the packaging device where one edge of the base film is sealed with a second edge of the base film and contain micro-perforations.

FIG. 19C is a cross-section of the packaging device shown on FIG. 19A and 19B with micro-perforations on the adhesive strip joining two edges of the base film.

FIG. 20A is a cross-section of the adhesive or lacquer seal used to join the base film in accordance with an exemplary embodiment of the present invention showing channels that direct flow of steam created when cooking the food product within the packaging device.

FIG. 20B is a cross-section of the adhesive or lacquer used to join the base film in accordance with an exemplary embodiment of the present invention showing different barriers used to separate the micro-perforations.

FIGS. 22A through 22C are isometric illustrations of a packaging device in accordance with an exemplary embodiment of the present invention where one edge of the base film is sealed with a second edge of the base film utilizing an adhesive strip and a sealant.

DETAILED DESCRIPTION OF THE PREFERRED EMBODIMENTS

The present invention provides a packaging device for a perishable food product, such as fruits and vegetables, which assists in optimizing quality and shelf-life of the perishable food product. It is also contemplated that the packaging device may be used for storing and distributing perishable meat products. The packaging device accomplishes this optimization by providing a desired interior atmosphere (where the perishable food product is located) for the storage and distribution of the perishable food product. It is contemplated that the perishable food products are non-frozen perishable food products. Further, the packaging device allows the cooking of the perishable food product while contained within. For example, the packaging device including the perishable food product within may be positioned for steam cooking within a microwave oven. Other cooking techniques as contemplated by those of ordinary skill in the art may be employed for cooking the perishable food product within the packaging device of the present invention.

The packaging device, or modified atmosphere packaging (MAP) system, provides a web for at least partially encompassing a perishable food product within, that may be constructed using one or more polymeric base films and in various configurations. For example, the web may be constructed as a bag, lid stock, stand-up pouch, and the like. It is contemplated that the base films may be any one of or combination of polymer groups such as polyvinyls (e.g., polypropylene), polyester (polyethylene terephthalate), polystyrenes (e.g., polyvinyl chloride), polysiloxanes (e.g., silicone rubber), polyalkenes (e.g., polyethylene—low density, low linear density, high density, etc.), and polydiens (e.g., natural rubber). Further, the base film may be extruded from a single polymer or blends of various polymers where each polymer performs a specific function, such as contributing strength, transparency, sealability, or machineability, to meet specific product requirements. Similarly, the material(s) of the base film may be processed using various technologies and treatment applications, such as lamination, to provide the packaging device with specific properties and for achieving particular configurations.

Figure 1:
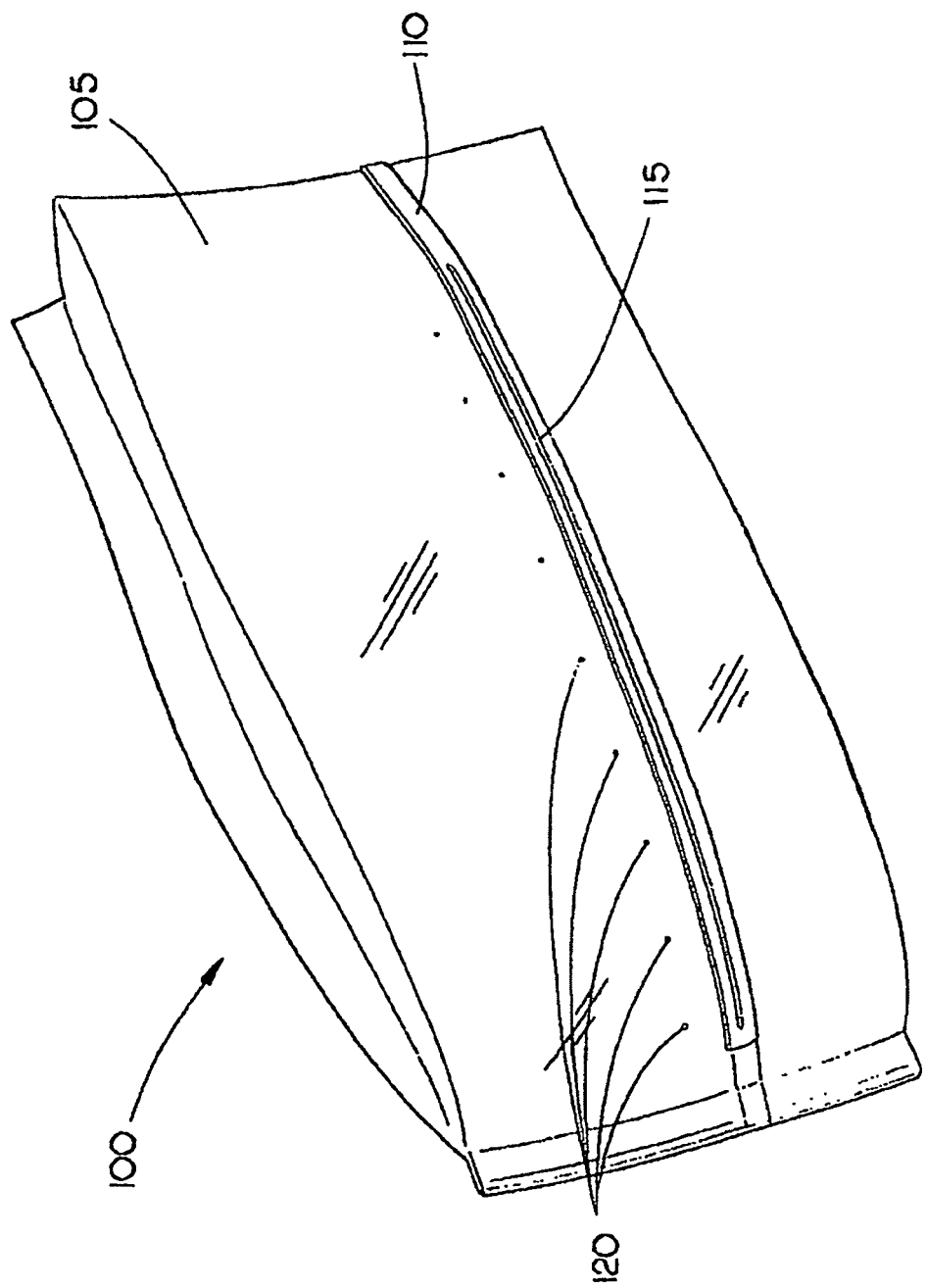
FIG. 1 is an isometric illustration of a packaging device including a plurality of micro-perforations in accordance with an exemplary embodiment of the present invention.
Figure 2:
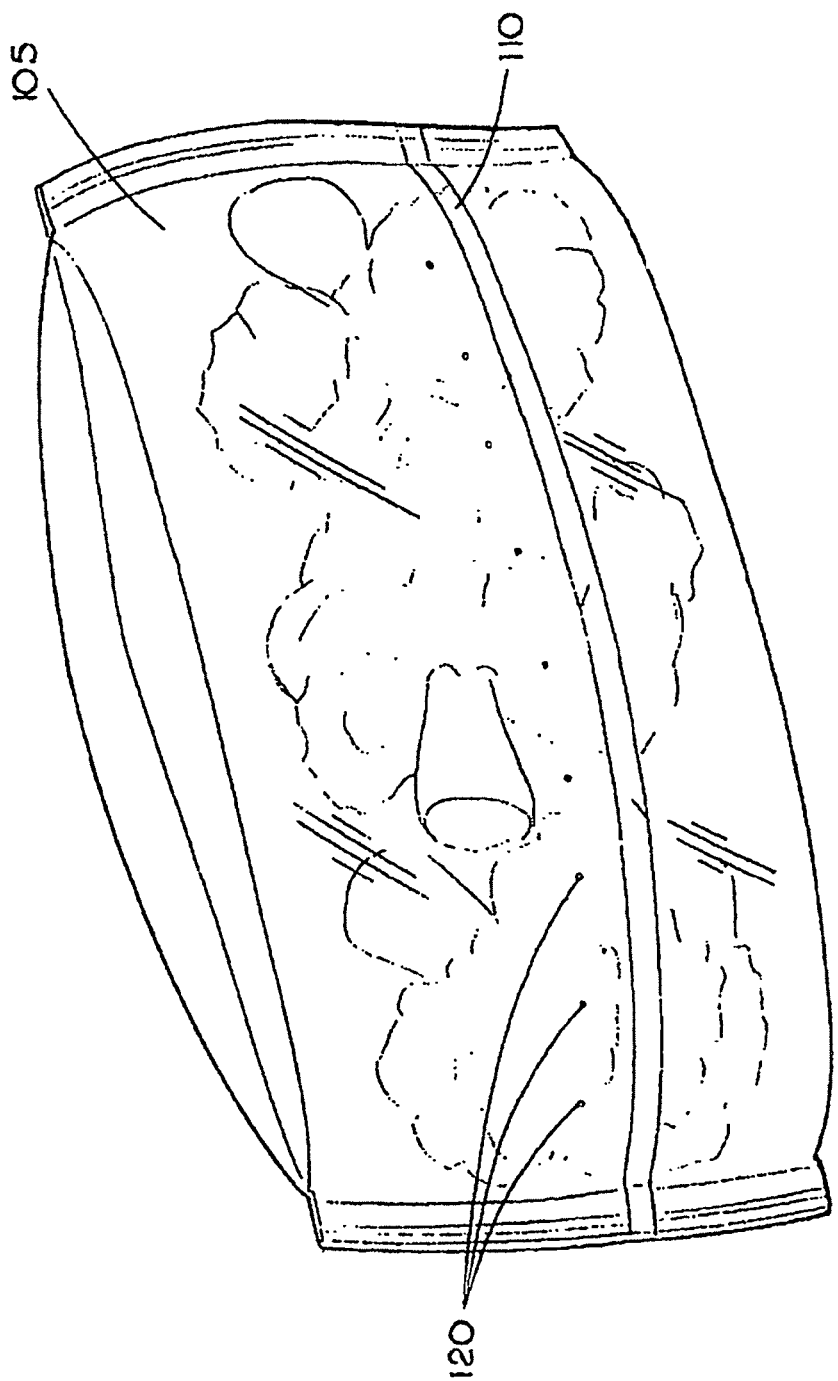
FIG. 2 is an illustration of the packaging device of FIG. 1, wherein the packaging device is sealed about a perishable food product stored within.

In a preferred embodiment shown in FIGS. 1 and 2, a packaging device 100 (MAP system) is in a bag configuration using heat sensitive polymeric base films bonded (i.e., laminated) together, which further provide a venting system for releasing pressure during a cooking process (i.e., steam cooking). Thus, it is understood that the packaging device 100 includes cooking properties that allow it to be used for the distributing, storing and cooking of a perishable food product. In the current embodiment, the packaging device 100 includes a first base film 105, which is made from a cast poly-propylene (CPP), which is bonded (laminated) to a second base film 110, which is made from a polyethylene terephthalate (PET). It is to be understood that the first and second base film may be constructed from various materials, such as those previously mentioned. The first base film 105 may be constructed generally in a standard bag configuration. For instance, the first base film 105 may provide a web where the sidewall is constructed from connecting the ends of a continuous piece of material, thereby constructing opposing sidewalls of a bag. Further, the top and bottom edges may be joined together and may include gusseting. This connection of the continuous piece of material and joining of the edge(s) provides the bag with an outer surface exposed to an exterior (ambient) environment and an inner surface which defines an interior space allowing for the storage of food products within and between the opposing sides of the inner surface. From Example 1, described below, the packaging device 100 or "bag" may be one hundred twenty one millimeters (121 mm) wide with additional gusset width of approximately thirty-seven millimeters (37 mm) on each side and three hundred fifty millimeters (350 mm) long. Other dimensional specifications for a steam cooking capable packaging device may be employed as contemplated by those of ordinary skill in the art. The second base film 110 may be constructed in the configuration of a "strip" of material. The strip may have certain dimensional characteristics which allow it to be connected with the first base film in such a manner that it provides an integral overall appearance. For instance, the strip may be one-quarter inch (¼") wide and have a length which corresponds to the length of the first base film 105. It is to be understood that the dimensional characteristics of the strip may vary without departing from the scope and spirit of the present invention. For instance, the strip may include a pre-determined length that is shorter than the length of the first base film 105 and may have a width less than or greater than one-quarter inch wide.

To provide the packaging device with proper cooking properties a venting system is included. Thus, before the two base films are bonded together the first base film 105 is provided a slit 115 (opening) on a continuous basis in a position that corresponds to the position of the bonding of the first base film 105 with the second base film 110. In a preferred embodiment, the bonding of the second base film 110 to the first base film 105 occurs using a lamination process where a lacquer is applied for sealing the first and second base films. Other sealing agents as contemplated by one of ordinary skill in the art may also be utilized. Thus, the slit 115 along a side of the first base film 105 is sealed by the lamination of the second base film 110 over the opening. It is contemplated that the web may be sealed either to itself or another substrate, with the seal formed being integral. On cooking, the pressure inside the package increases to a point where the seal in the area of the lacquer coating starts to break open. The bond provided by the seal has been engineered to break open (release) at a particular level of pressure build-up.

The breaking/opening of the lacquer seal over the slit 115 provides an outlet through which steam may escape. The seal may provide an outlet in various forms, such as a directed channel (communicating passage) which may direct the flow of the escaping steam to a single venting point or a series of apertures, which may allow the steam to vent from and through multiple points of the seal. The single venting point is an opening located between the first base film 105 and second base film 110 which allows the steam escaping through the slit 115 to exhaust into the outer environment outside the bag. In a multiple venting point configuration the second base film 110 may include multiple openings through the film that upon a breakdown of the lacquer seal provide multiple channels through which steam may exhaust from the interior atmosphere of the bag to the outside environment. Alternative venting means as contemplated by those of ordinary skill in the art may be employed without departing from the scope and spirit of the present invention and allow for the steam cooking of the packaged contents It is contemplated that the width and length of the slit 115 in the first base film 105 may vary. For instance, the slit 115 may run the entire length of the bag or may extend only a partial distance along the side of the bag. The slit 115 may extend from a starting point that is disposed proximal to or at an edge of the bag or the slit may be positioned in a generally central portion of the side of the bag. Additionally, the slit 115 may have a width ranging from one millimeter (1 mm) to one half inch (½"). It is contemplated that various other slit widths as contemplated by those skilled in the art may be constructed within the side of the bag. Further, the dimensional characteristics of the "strip" 110 used in sealing over the slit may vary to accommodate the varying dimensional characteristics of the slit 115. For example, the "strip" 110 may have a length generally shorter than the length of the bag. It is further contemplated that the bag may be given multiple slits, which may be sealed by multiple "strips" and/or sealed to itself using the lamination process. In the alternative, various sealing techniques may be employed, such as using various adhesive or epoxy compounds to affect the seal. Further, the steam cooking properties of the bag may arise from the use of structural variance within the base film. For instance, a specific section of the bag may be "thinned" or otherwise structurally degraded, such that upon cooking and the build up of pressure within the web of the packaging device the base film is caused to rupture at this specific section.

This laminated strip configuration allows the packaging device to be used during steam cooking (such as cooking in a microwave oven) without significantly altering the steam cooking properties of the web. The steam cooking properties may. include various structural integrity characteristics of the base film(s) material, such as heat resistance, moisture resistance, interior heat build-up and the like. Further, the lacquer seal used may be engineered with various structural characteristics that allow it to resist premature or delayed structural breakdown during the cooking process, thereby ensuring that the steam is allowed to escape and be vented at the proper time.

The packaging device 100 further includes a plurality of micro-perforations 120 for breath-ability and quality protection of respiring and gas sensitive (one or combination of $O_2$, $CO_2$, $C_2H_2$ and $H_2O$ vapor) food products which are being stored within the interior atmosphere of the web. In a preferred embodiment, described below in Example 2, the bags include nine (9) micro-perforations having a diameter of one hundred twenty microns (120μ) each. As will be described, the number and size of the micro-perforations may vary to accommodate the use of the packaging device with various food products. It is to be understood that the micro-perforations allow the packaging device to retain its steam cooking properties.

The micro-perforation technology employed is based upon the inventor's discovery that first, the tolerance to $CO_2$ by the tissue of various perishable food products may be improved by increasing internal $O_2$, and more particularly by maintaining the preferred ratios of $CO_2$ to $O_2$ in particular ranges, such as 2.5:1 to 3.5:1. Thus, the micro-perforation technology allows for the use of high $CO_2$ and improved levels of $O_2$ for distribution and storability of fruits and vegetables. Second, that within pre-defined limits of $CO_2$ and $O_2$, that may be determined based on the food product or desired bag characteristics, water vapor (RH>70%) and ethylene (>100 ppm) may interact in a synergistic fashion to confer additional quality protection and shelf-life. Thus, the micro-perforation technology (i.e., proper selection of base sheet, hole size, hole shape, hole number and hole positioning) employed for the various food products identified herein, is commensurate in scope with that disclosed in U.S. patent Ser. No. 10/855,305, which is herein incorporated by reference in its entirety. Further, the micro-perforations may allow the transmission of various agents through them, such as ripening agents, preserving agents, and the like.

The capabilities of the packaging device 100 to assist in optimizing the quality and shelf-life of the food products and allow for the cooking of the food products in situ, such as steam cooking in a microwave, is based upon: (i) micro-perforations allow the microwavable polymeric packaging device(s) to retain their steam cooking attributes, (ii) micro-perforations may be employed to achieve a food product specific internal package (web) atmosphere of $O_2$, $CO_2$ and Water Vapor that confer quality protection and shelf-life extension during distribution and marketing, and (iii) methods of cooking fresh produce may be combined with the functions of breath-ability provided by the micro-perforated packaging. These capabilities are also present in the various embodiments shown in FIGS. 3 through 6 below.

The application of the micro-perforation technology to a web of a packaging device (MAP system) with the cooking properties/capabilities described herein, including the proper selection of a base film, micro-perforation hole size, micro-perforation hole number and micro-perforation hole positioning may be conveniently and reliably used to achieve target atmospheres of $O_2$, $CO_2$, and water vapor within the interior atmosphere of the web. Further, the application of micro-perforation technology to various packaging devices that may be constructed in various sizes or shapes, using various materials and construction technologies and may employ various modified or controlled atmosphere technologies is contemplated by the present invention.

The size and number of the micro-perforations are determined based on the per unit weight (perishable (fresh) food product) to surface area (base film) ratio, the respiration rate of the fresh food products and the shelf life requirements. It is contemplated that the number and size of the micro-perforations for an embodiment of the packaging device may vary. Thus, it is contemplated that the present invention may be used to provide a determined shelf-life which may be a maximization of the shelf-life of the fresh food product or less than the maximum. Diameter of the micro-perforations may be in the range of one micron (1μ) to five hundred (500μ) microns, more preferably from fifty microns (50μ) to one hundred fifty (150μ) microns. The number of micro-perforations included may range from one (1) to one thousand (1,000), more preferably two (2) to one hundred fifty (150). The density of holes (micro-perforations) in the film will be determined by the above-mentioned parameters but will generally be in the range of five (5) to fifty (50) holes per unit weight (i.e., gram(s), ounce(s), pound(s), and the like) of fresh food product offering depending on the required open area and the base sheet gas transmission properties.

The open area refers to the cumulative amount of open space through the base film(s) of the packaging device provided by the micro-perforations. For example, a film having two micro-perforations would have its total open area defined by the cumulative size (area) of each the openings. Thus, if each of the openings of the two micro-perforations have a diameter of twenty microns (20μ) ($\mu=10^{-6}$ m) then the surface area (open area of the micro-perforation) of each micro-perforation will equal π multiplied by $(10\times10^{-6}$ m$)^2$ or surface area=$\pi r^2$, this amounts to $3.14\times10^{-10}$ m of open area. Therefore, the open area provided by the two micro-perforations may be substantially equal to $6.28\times10^{-10}$ m. It is to be understood that the required open area may be pre-determined based upon the type of perishable food product to be stored within the packaging device of the present invention or based on various alternatives, such as a pre-determined number of micro-perforations, pre-determined respiration rate, and the like without departing from the scope and spirit of the present invention.

Since percentage of open area is important, there is an interaction between hole size and hole density. The base film, hole size and hole number are selected to achieve oxygen ($O_2$) levels in the range of two percent (2%) to eighteen percent (18%) and more preferably less than ten percent (10%), carbon dioxide ($CO_2$) levels in the range of five percent (5%) to twenty-two percent (22%) and a relative humidity (RH) equal to or greater than seventy percent (70%), more preferably ninety percent (90%) to ninety-nine percent (99%). The packaging device may further maintain an interior atmosphere with a preferred ratio of $CO_2$ to $O_2$. The ratio of $CO_2$ to $O_2$ may vary depending on various factors, such as the respiration rate of the food product. As stated previously, the ratio may range from 2.5:1 to 3.5:1 or have a higher or lower ratio factor as determined by the respiration needs of the food product or desired design characteristics of the bag. Therefore, the ratio may vary and the interior atmosphere may have a higher or lower $CO_2$ and/or $O_2$ concentration without departing from the scope and spirit of the present invention.

Figure 3:
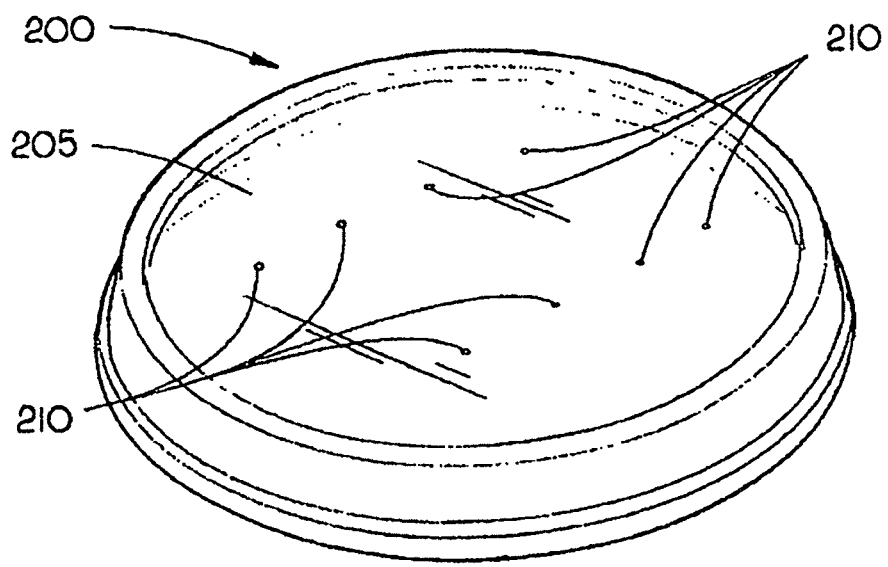
FIG. 3 is an illustration of a packaging device in the configuration of a lid stock including micro-perforations for connection with a tray in accordance with an exemplary embodiment of the present invention.
Figure 4:
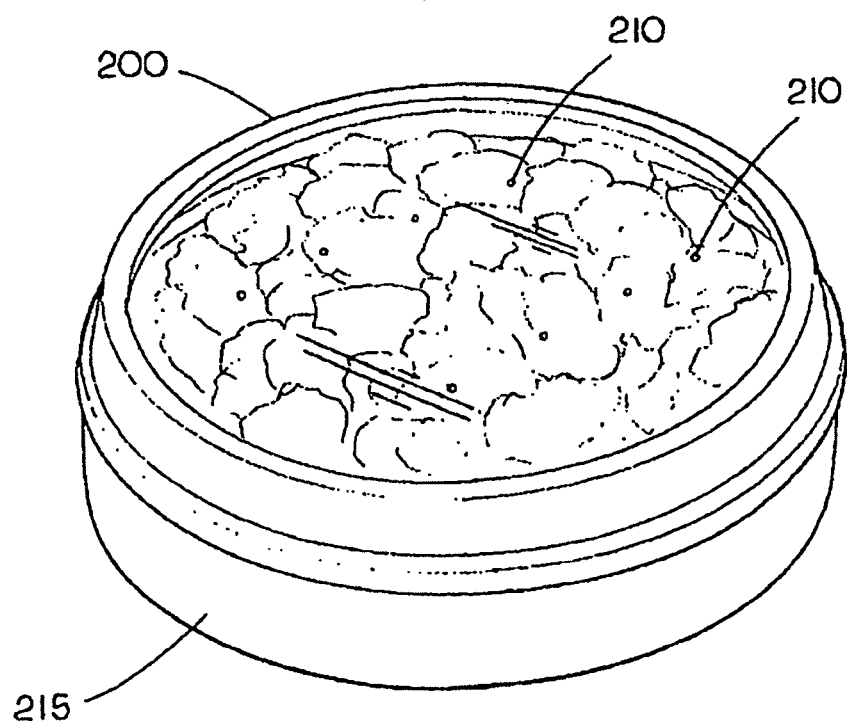
FIG. 4 is an illustration of the lid stock of FIG. 3 connected with and sealing the tray including a perishable food product
Figure 5:
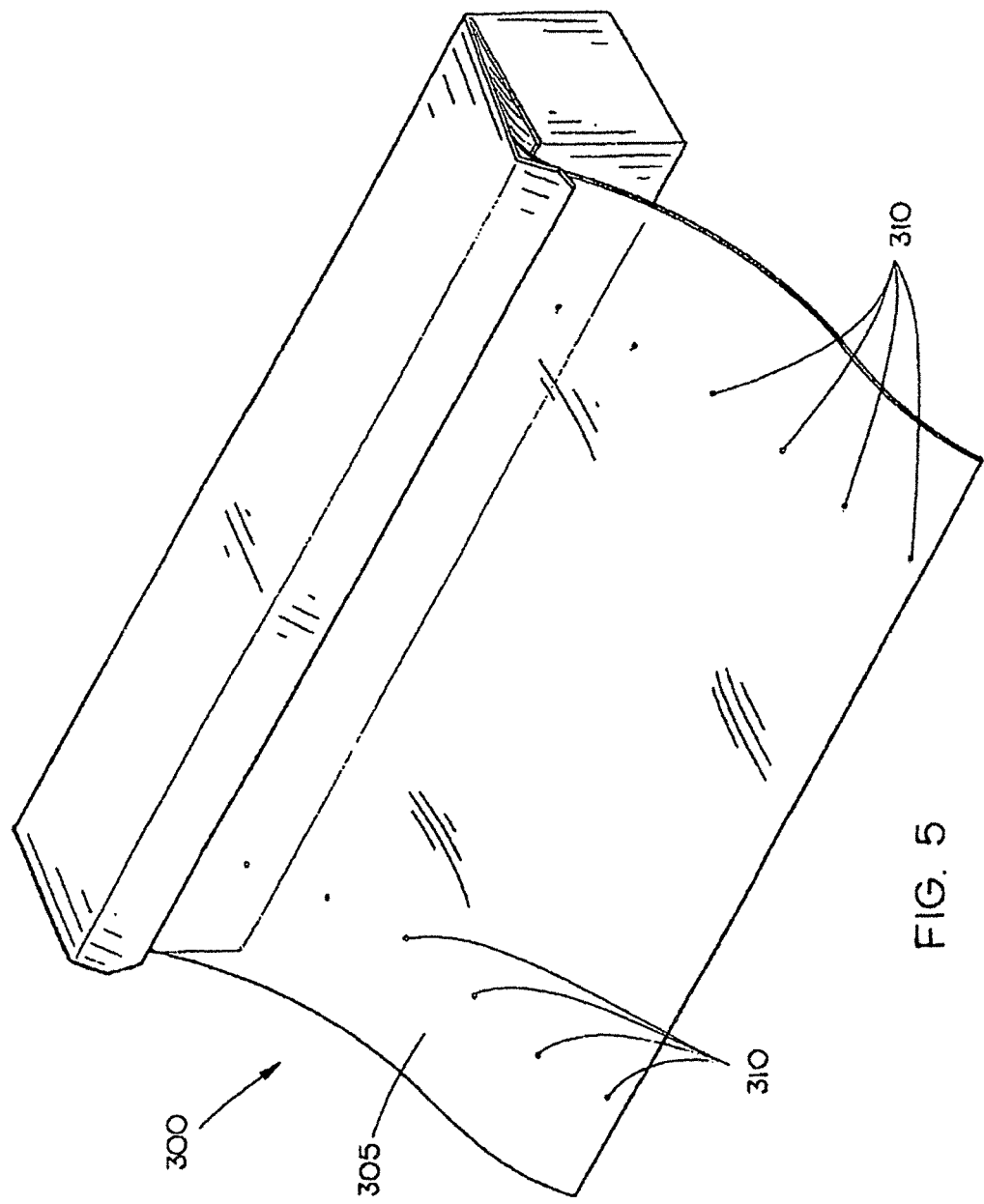
FIG. 5 is an illustration of a roll stock including a plurality of micro-perforations in accordance with an exemplary embodiment of the present invention.

Referring now to FIGS. 3 and 4, a packaging device is constructed as a lid stock 200 including a first base film 205. In a preferred embodiment, the first base film 205 is a transparent polypropylene for connection with a tray 215. The lid stock 200 further includes a plurality of micro-perforations 210 that extend through the first base film 205 and provide the advantages of the present invention for the storage, distribution and cooking of a perishable food product. In the current embodiment, the lid stock 200 is generally configured as a transparent film which connects with and seals the tray creating a closed interior atmosphere. It is to be understood that the lid stock 200 may be constructed from any of the various materials identified previously and include various structural properties, such as being transparent, translucent, opaque, and the like, and having various rigidity characteristics. The lid stock 200 is capable of being constructed to provide proper sealing of variously configured trays and the like. Thus, the lid stock 210 may be constructed in a pre-determined pattern to successfully engage with a specific tray having certain dimensions. In FIG. 5, the packaging device is shown alternatively constructed as a roll stock 300 including a base film 305. It is contemplated that the roll stock 300 may be any of the numerous plastic wraps currently available that are modified to include the micro-perforations and provide the user the ability to determine overall roll stock 300 length for engagement with various trays. The roll stock 300 also includes a plurality of micro-perforations 310 which allow it to provide a proper internal atmosphere when the roll stock 300 is sealed with a tray 315. It is contemplated that the lid stock 200 and/or roll stock 300 may be variously configured, such as in various polygonal configurations like a generally square shape, rectangular shape, diamond shape, and the like, or other configurations, such as an conical shape, oval shape, and the like, for connection with a tray in establishing a modified atmosphere system.

The lid stock 200 and/or roll stock 300 may be used during a cooking process, allowing a food product stored between the tray and the lid/roll stock to be cooked. The micro-perforations included allow the lid/roll stock to retain its cooking properties. The number and size of the micro-perforations may vary in accordance with that indicated previously. Preferably, the number of micro-perforations may range from two (2) to seventy-eight (78) and have a diameter ranging from one micron (1μ) to one hundred fifty microns (150μ).

Figure 6:
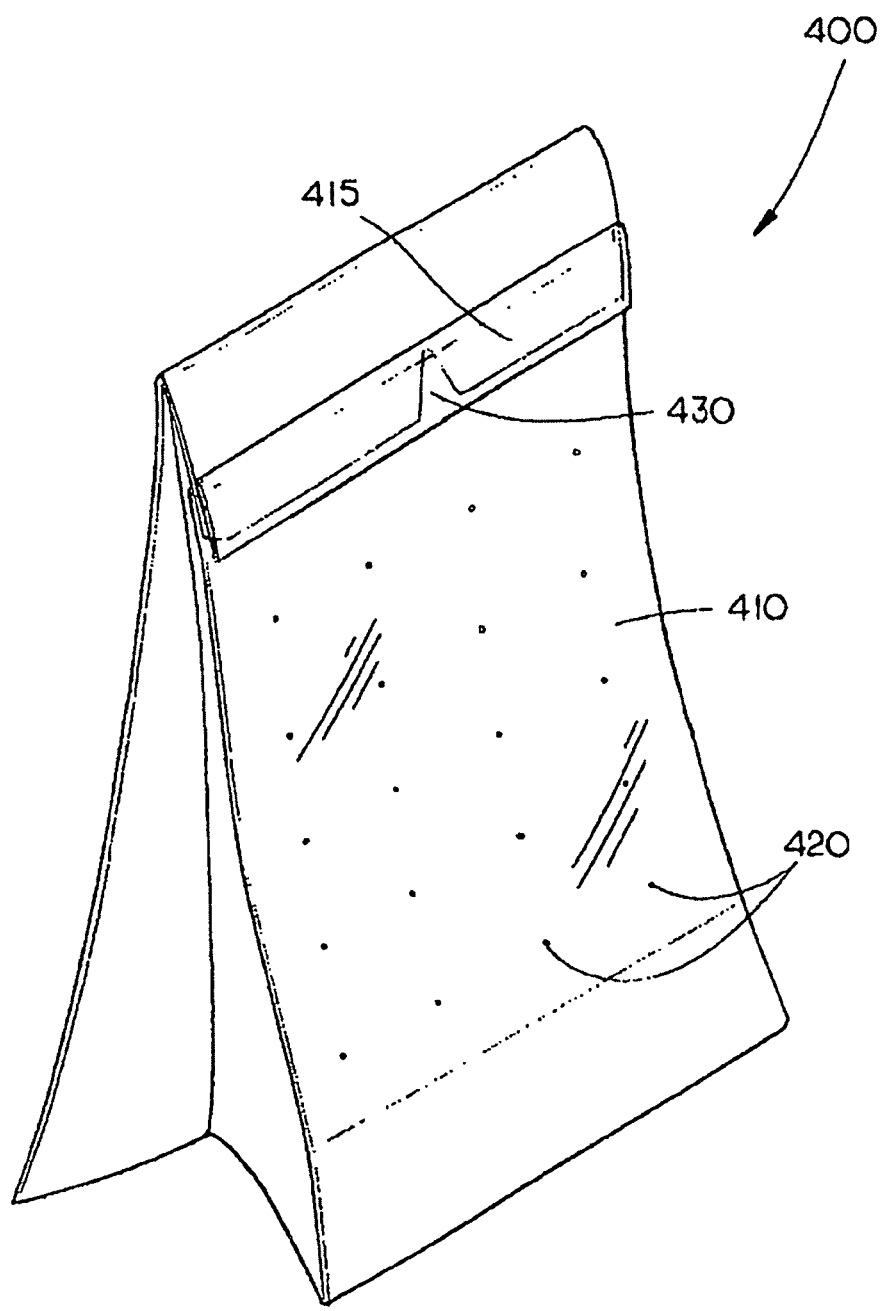
FIG. 6 is an isometric illustration of a packaging device in the configuration of a stand-up pouch including micro-perforations in accordance with an exemplary embodiment of the present invention.

A stand-up pouch 400 including a first base film 410 connected with a second base film 415, wherein the first base film 410 includes a plurality of micro-perforations 420 is shown in FIG. 6. The stand-up pouch 400 is capable of steam cooking its packaged contents and may be variously configured including dimensional characteristics, such as a width of the pouch ranging from one hundred sixty millimeters (160 mm) to one hundred ninety-five millimeters (195 mm) and the length of the pouch ranging from one hundred eighty millimeters (180 mm) to one hundred ninety-five millimeters (195 mm). The length and width of the stand-up pouch may be greater than or less than the ranges identified above without departing from the scope and spirit of the present invention.

It is contemplated that the configuration of the stand-up pouch 400 may be determined by the amount or weight of food product to be stored. The stand-up pouch 400 may be constructed to hold various food product weights ranging from one hundred eight grams (180 g) to four hundred fifty grams (450 g). Food product weights which are greater than or less than the range provided may be accommodated by the present invention. The dimensional and volumetric approaches to configuring the stand-up pouch 400 allows for the construction of pouches specific to a consumer need.

The number (density) and size (diameter) of the micro-perforations 420 included in stand-up pouch 400 may vary as well. Generally, the number of micro-perforations per bag is in accordance with that previously mentioned, preferably the number of micro-perforations range from two (2) to twenty-four (24). In the current embodiment, twenty (20) micro-perforations are included to extend through the first base film 410 and allow the transmission of gases between the stand-up pouch 400 interior space and an external environment. The micro-perforations are generally sized in accordance with that previously mentioned, preferably the micro-perforations have a diameter of one hundred twenty microns (120μ). It is contemplated that the number and size of the micro-perforations per stand-up pouch may vary without departing from the scope and spirit of the present invention.

The stand-up pouch of FIG. 6 includes a venting system 430 that allows for the release of pressure build-up during a cooking process. In a preferred embodiment, the venting system includes an area of the first base film 410 (CPP film) which is coated, in register, with a lacquer. The lacquer seal bonds the first base film 410 with the second base film 415 and starts to break open upon an increase of pressure within the interior of the stand-up pouch during the cooking process. In the current embodiment, the area on the first base film 410 of the stand-up pouch 400 is punch slit, folded back on itself and heat sealed to form an external flap on the back of the pouch, wherein the punch slit penetrates fifty percent (50%). A seal is formed about four millimeters in width, in the center aligning the seal with the punch slit. The seal may be arrow shaped or may be variously configured to allow for the operation of the lacquer seal in releasing the build-up of pressure during cooking. Because this central arrow shaped sealed area has been pre-coated with the lacquer the heat seal at this point is weakest. In this embodiment, due to the arrow shaped configuration of the lacquer application, the loosening of the seal due to pressure buildup leads to the formation of a hole allowing pressure buildup (i.e., steam) to escape.

The lid/roll stock and stand-up pouch of FIGS. 3 through 6 also include micro-perforations to assist in increasing the shelf-life and quality of the food products contained within. As with the bag of FIGS. 1 and 2, the micro-perforations continue to allow the lid stock and stand-up pouch to substantially retain the steam cooking properties as these items had without the presence of the micro-perforations. Thus, the micro-perforation technology may be utilized with exiting storage (bag, lid/roll stock, pouch) technologies or in conjunction with newly constructed storage technologies. As described below in reference to Examples 4 and 5, the number and size of the micro-perforations for the lid/roll stock and stand-up pouch may vary to accommodate various factors.

The micro-perforated packaging device(s) which have been described and are for use with perishable food products (fresh produce), such as broccoli florets, cauliflower, carrots, corn, and the like, which exhibit a higher rate of respiration over that of alternative food products, provide an advantage over the use of conventional solid (i.e., no holes) film packaging or other packaging devices which attempt to provide modified atmosphere capabilities, both of which may over-modify the atmosphere within the packaging resulting in fermentation. The non-perforated (solid) film packaging devices currently employed, due to the over modification of the atmosphere within the packaging, reduce the shelf-life of the food product as will be further described in detail below.

Additionally, moisture control is considered equally essential in preserving the quality of fresh food products, such as broccoli florets, carrots, corn, and the like, and assisting in providing prolonged shelf-lives for these products. A micro-perforated packaging device further assists in ensuring the proper moisture content within a packaging containing fresh food product(s). As stated previously, the micro-perforated packaging devices allow an internal atmosphere to maintain a desired relative humidity (i.e., 70-99% RH). Thus, the micro-perforated packaging devices maintain a moisture level within the packaging devices, such that condensate is continually maintained within the interior atmosphere of the packaging device. This maintenance of condensate assists in promoting the quality and extended shelf-life characteristics provided by the packaging device(s) including micro-perforations of the present invention.

The micro-perforated film of the web containing the fresh perishable food products includes a micro-perforation hole size and density which allows a proper internal atmosphere for the fresh food products (florets) to be achieved. This assists in preventing fermentation of the fresh food product within the packaging, maintaining sufficient moisture for the achievement of optimum quality and extended shelf life of the fresh food product.

The following examples provide a comparison of the micro-perforation packaging devices of the present invention and conventional (non-perforated) packaging devices. Comparison of performance characteristics of the packaging devices and the food products contained within are detailed for the areas of steam cooking, quality and shelf-life.

While broccoli, carrots, cauliflower and corn have been used as test models for this invention, the teachings of this invention may easily be extended to other food product offerings that have perishable/fresh food products, such as fresh produce and/or meats, in their ingredient mixes. For instance, the present invention may be used to provide a Ready-to-Eat meal. A Ready-to-Eat meal may be comprised of various food products contained within a single/individual packaging device. For example, one Ready-to-Eat meal may comprise a mixture of different produce food products. Alternatively, a Ready-to-Eat meal may comprise a meat food product. Further, a Ready-to-Eat meal may include a mix of at least one produce food product and at least one meat food product. It is contemplated that various spices, herbs, seasonings, dressings, flavoring substances, and the like may be included in a Ready-to-Eat meal contained within a packaging device of the present invention. The packaging device may advantageously provide the Ready-to-Eat meal with the steam cooking performance characteristics and improved shelf-life performance characteristics shown in the examples provided below and previously discussed, herein.

EXAMPLE 1

Example 1, demonstrates the effects of two (2) minute steam cooking on the internal package pressure, internal package temperature, product temperature and organoleptic product quality of various fresh produce products using non-perforated CPP-PETT laminate bags (121 mm wide with additional gusset width of approximately 37 mm on each side and 350 mm long).

Gusseted bags made from CPP-PETT laminate were used to pack shredded carrots, broccoli, cauliflower and corn. Eight ounces of product were packed in these bags individually, heat sealed and steam-cooked for 2 minutes using an 800 watt microwave oven. Pressure buildup within the bags during cooking, internal bag temperature, product temperature and organoleptic properties were recorded. Further, organoleptic analysis based on taste, flavor retention and appearance was performed using a rating scale of 1 to 5, 5 being excellent, 4 being very good, 3 being good, 2 being poor and 1 being unacceptable.

TABLE 1

Conventional Packaging device-Effect of steam-cooking on pressure buildup, bag temperature, product temperature and organoleptic rating score of various fresh produce food products.

| Product Name | Pressure (m bars) | Internal Bag Temp (° C.) | Product Temp (° C.) | Organoleptic Score |
|---|---|---|---|---|
| Shredded Carrots | 4.2 | 93.2 | 94.5 | 4.2 |
| Cauliflower | 4.1 | 95.1 | 97.2 | 4.5 |
| Broccoli | 4.3 | 92.3 | 97.1 | 4.7 |
| Corn | 4.2 | 96.6 | 100.4 | 5.0 |

EXAMPLE 2

In Example 2, a packaging device of the present invention was used to demonstrate the effects of micro-perforations on steam cooking properties of CPP-PET laminate bags for various fresh produce products (bag dimensions and fresh produce products used were identical to those in Example 1).

These CPP-PET laminate gusseted bags, each bag having nine (9) micro-perforations of one hundred twenty microns (120µ) in diameter, were used to pack shredded carrots, broccoli, cauliflower and corn. Eight ounces of the fresh produce food product were packed individually in the bags, heat sealed and steam-cooked for 2 minutes using an 800 watt microwave oven. Pressure buildup within the bags during cooking, internal bag temperature, product temperature and organoleptic properties were recorded in a manner similar to that used and described in Example 1.

TABLE 2

MAP System-Effect of steam-cooking on pressure buildup, bag temperature, product temperature and organoleptic rating score of various products.

| Product Name | Pressure (m bars) | Internal Bag Temp (° C.) | Product Temp (° C.) | Organoleptic Score |
|---|---|---|---|---|
| Shredded Carrots | 4.1 | 94.8 | 96.4 | 4.5 |
| Cauliflower | 4.2 | 96.6 | 98.3 | 4.3 |
| Broccoli | 4.3 | 96.5 | 98.8 | 5.0 |
| Corn | 4.3 | 98.2 | 100.5 | 5.0 |

A comparison of the data from Table 1 and Table 2 demonstrates that the steam cooking properties exhibited by the two different bags were substantially similar. Therefore, the steam cooking properties of the packaging devices (bags including micro-perforations) were substantially equivalent and for some properties showed increased performance characteristics over the conventional non-perforated packaging devices. Thus, the packaging devices may be developed as product specific micro-perforated packages for shelf life extension while retaining the steam cooking properties of the packages.

EXAMPLE 3

Example 3 compares the shelf life of broccoli florets that were packed in non-perforated and micro-perforated CPP-PET laminate bags in units of one pound (1 lb.) product and held at 5° C. The bag size for micro-perforated and non-perforated packages was nine by twelve (9×12) inches. The micro-perforated bags included sixteen (16) micro-perforations of one hundred twenty microns (120µ) in diameter.

On day three of the evaluation, the non-perforated bags were fully bulged. The bags were completely anaerobic as the package oxygen ($O_2$) was around 0.5% and carbon dioxide ($CO_2$) content was 30%. On bag opening, strong off-flavor notes were detected indicating the occurrence of fermentation of the broccoli florets within the non-perforated bags. By contrast, the broccoli florets in micro-perforated packages were in excellent condition. The internal atmospheres of micro-perforated bags were measured to consist of 12% oxygen ($O_2$) and 10% carbon dioxide ($CO_2$) on day three of holding. No off-flavor notes were detected in the perforated packs indicating the non-occurrence of fermentation of the broccoli florets. While the shelf life of broccoli florets stored in the non-perforated packs was less than three (3) days, the micro-perforated packages allowed a storability of twenty-one (21) days at 5° C. of the broccoli florets. This increase in storability (shelf-life) is provided by the gas transmission capabilities allowed by micro-perforations of the packaging devices.

EXAMPLE 4

Example 4 illustrates the applicability of the invention to fresh produce tray offerings. A lid stock including micro-perforations was utilized to provide a packaging device in accordance with the present invention. Thus, three corn cobs weighing approximately 510 grams were packed in a six by nine (6×9) inch polypropylene tray lidded with micro-perforated CPP-PET laminate and held at 5° C. The micro-perforations were positioned such that eight (8) micro-perforations of one hundred twenty microns (120µ) in diameter size were included per impression Similar to Examples 1 and 2 above, the steam cooking properties of this packaging device were uninfluenced by the presence of the micro-perforations. In addition, the corn achieved a shelf-life of fourteen (14) days. By comparison, the corn packed in polypropylene trays lidded with non-perforated CPP-PET laminate became anaerobic (began fermenting) on day two (2) of packing. Thus, the packaging device of the present invention provides a significant shelf-life advantage over that which may be achieved using a conventional, non-perforated tray and lid which further assists in the storing, distributing, retailing, and cooking of such perishable food products.

EXAMPLE 5

Example 5 illustrates the applicability of the invention to fresh produce pouch offerings. Such pouch offerings provide a Ready-to-Eat food product to the consumer.

A mixture of broccoli, cauliflower and carrots was packed in CPP-PET micro-perforated pouch fitted with a pressure release valve and held at 5° C. It is to be understood that the pouch is generally a standard stand-up pouch, such pouches being currently employed on a large scale within the food product retailing industry that include micro-perforations. The micro-perforations were positioned such that twenty (20) micro-perforations of one hundred twenty microns (120µ) in diameter size were included per impression.

Using the micro-perforated pouch, the perishable food products within achieved a shelf life of twelve (12) days and the steam cooking properties were uninfluenced by the micro-perforations. By comparison, the product mixture consisting of broccoli, cauliflower and carrots packed in non-perforated CPP-LE laminate pouches became anaerobic (began fermenting) on day three (3) of packing. Again, the micro-perforation of the pouch in order to provide a packaging device in accordance with the present invention assists in the storing, distributing, retailing, and cooking of such perishable food products as compared to conventional packaging devices.

The shelf-life capabilities of such perishable food products within the packaging devices including the micro-perforation technology are significant when compared to the shelf-life achieved by the non-perforated, conventional packaging devices. In Example 3, the shelf-life was extended from three (3) days (non-perforated pouch) to twenty-one (21) days (micro-perforated pouch) and in Example 4, the shelf-life was extended from two (2) days (non-perforated) to fourteen (14) days (micro-perforated). Both of these examples indicate that the perforation of the pouch and lid stock exhibit an increase in the shelf-life of the perishable food product stored within of 700%. The mixture of food products in Example 5 showed that the non-perforated container provided the food products a shelf-life of only three (3) days while the micro-perforated container provided the food products a shelf-life of twelve (12) days, an increase in the shelf life of the food products of 400%.

As previously mentioned, the micro-perforation technology may be employed to provide various gas transmission properties across the boundary of the base film used for constructing the web of the packaging device. For instance, the size and density of the micro-perforations may be determined to provide a food product contained within a packaging device of the present invention with an increase of shelf-life of anywhere from 25% to 700% based off of the shelf-life provided by a non-perforated, conventional packaging device. Thus, where a conventional packaging device may provide four (4) days of shelf-life before fermentation begins, the MAP system may provide a shelf-life of five (5) to twenty-eight (28) days. It is also contemplated that the micro-perforation technology may be employed to provide a desired shelf-life of a food product which is less than or greater than the shelf-life ranges identified above. For example, the micro-perforation technology may be employed to provide a four (4) day shelf-life or greater than twenty-nine (29) day shelf-life.

The micro-perforation technology for constructing a packaging device in accordance with the present invention may be employed with various types of packaging devices, such as over-the-counter products. For instance, a conventional packaging device, such as the bag described above in the examples, may be micro-perforated to provide a packaging device of the present invention. Various self-adhering plastic based film products, such s the roll stock shown in FIG. 6, may be micro-perforated to provide a packaging device in accordance with the present invention. These conventional, over-the-counter products, including such devices as the stand-up pouch, may have micro-perforations included in a post production process. These various packaging devices may provide steam and other cooking capabilities in order to facilitate the increased ease of use of the food products contained within.

Figure 7:
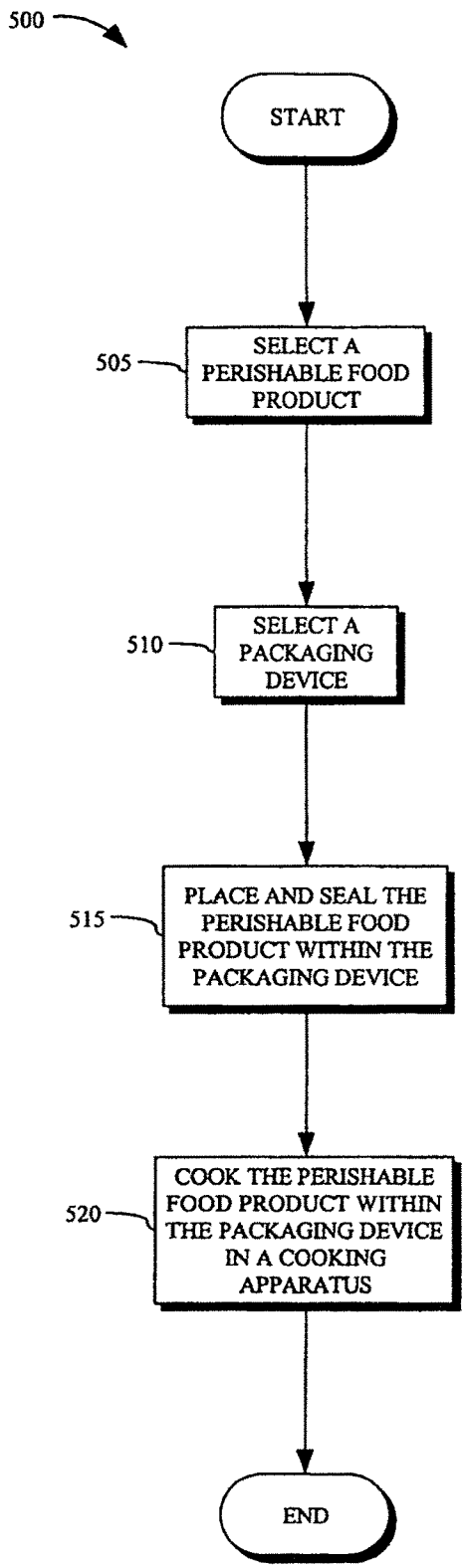
FIG. 7 is a block diagram illustration of a method of cooking a perishable food product using a packaging device including micro-perforations in accordance with an exemplary embodiment of the present invention.

Referring now to FIG. 7, a method 500 of cooking a perishable food product is provided. In a first step 505 a perishable food product is selected. The perishable food product may be one food product or a combination of food products. The perishable food product may further be selected from produce or meat food products without departing from the scope and spirit of the present invention. After the selection of the perishable food product, a packaging device including micro-perforations is selected in step 510. The packaging device may be in accordance with any of the exemplary embodiments shown in previous drawing figures and describe above. The packaging device may be selected on the type of perishable food product(s) and their respiration rate or the weight of the food products may determine the packaging device selected. The selection of the packaging device may be further determined by the number of micro-perforations included on the packaging device. For instance, a first bag may have a certain number and size of micro-perforations and it may be known that that number of micro-perforations at that size do or do not allow for the packaging device to provide a proper internal atmosphere for the type and weight of perishable food product selected. Therefore, that particular packaging device may or may not be selected. It is contemplated that the packaging device selected may not provide the maximum shelf-life characteristics as described above in the examples for a particular perishable food product. It may be the case that other considerations such as strength or rigidity of material may be a more important consideration. Other considerations as contemplated by those of ordinary skill in the art may be factored into the selection of the packaging device in the current method.

Once the packaging device is selected, in step 515 the selected perishable food product(s) is placed within and the packaging device is sealed about the perishable food product(s). As described previously, the sealing of the packaging device may be through use of an integral seal, such as a heat sealing technique, or a re-sealable technology. It is to be understood that the packaging device may allow for expansion in its interior space in order to accommodate the storing and sealing about of the perishable food product within the interior space. The expansion capabilities may be provided through various systems, such as the stand-up pouch system and or gusset system described previously. Other systems as contemplated by those of skill in the art may be employed without departing from the scope and spirit of the present invention.

With the perishable food product sealed within the packaging device, the packaging device is then placed in a cooking apparatus (i.e., microwave oven, convection oven, open flame grill, or the like) and cooked in step 520. The cooking apparatus is heated and transfers that heat to the packaging device, which in turn transfers that heat to the perishable food product stored within. It is a particular advantage of the micro-perforations included within the packaging device that they do not affect the cooking properties of the packaging device as the perishable food products are being cooked. The cooking time, as determined by the operator of the cooking apparatus, identifies the completion the cooking process for the perishable food product. Thus, the packaging device of the instant invention allows for the cooking of a perishable food product.

It is further contemplated that the packaging device employed for this method of cooking a perishable food product includes a venting system which allows pressure that builds up within the interior space of the packaging device during the cooking process, to escape. The venting system employed for this method of cooking the perishable food product may be similar to those describe previously for the exemplary embodiments of the present invention. In another step of the current method, after the cooking process is completed the user may remove the packaging device and cooked perishable food product from the cooking apparatus and unseal or open the packaging device and remove the cooked perishable food product. After removing the perishable food product it is contemplated that the user may then eat the cooked perishable food product.

Figure 8:
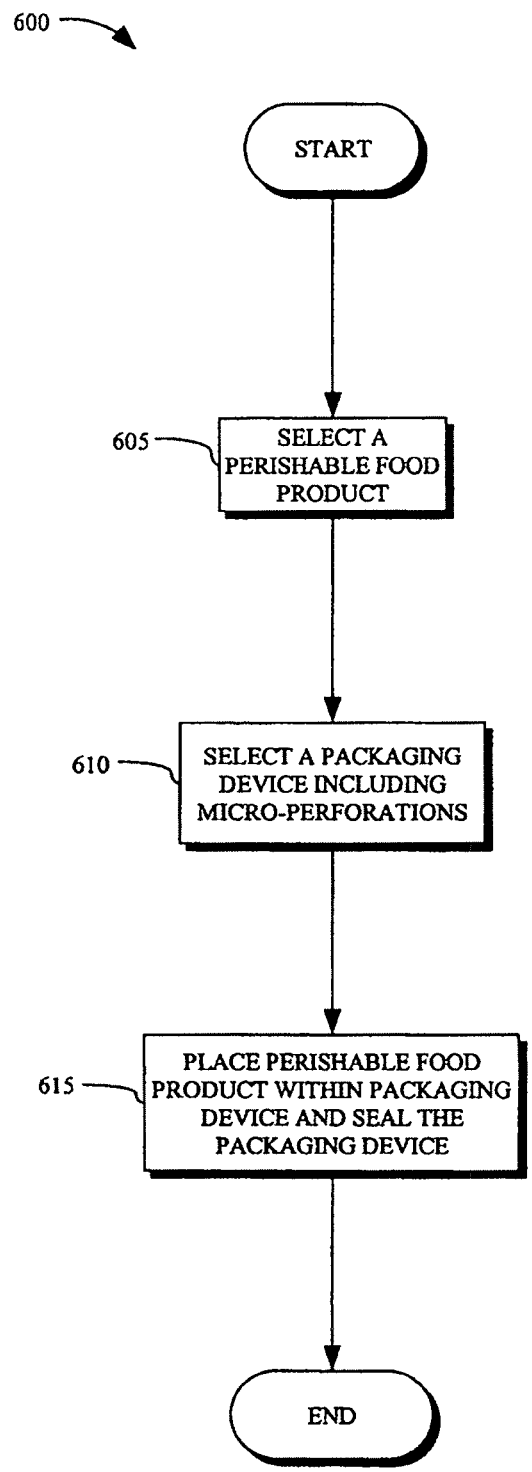
FIG. 8 is a block diagram illustrating a method of prolonging the shelf-life of a perishable food product.

Referring now to FIG. 8 a method 600 of prolonging the shelf-life of a perishable food product is shown. In a first step 605 a perishable food product is selected. The perishable food product may be fresh produce, such as fruit(s) and/or vegetables. After selecting the food product a packaging device including micro-perforations is selected in step 610. The packaging device may be selected based on the ability of the micro-perforations to provide a desired interior atmosphere within which the food product will be stored. Additionally, the respiration rate, size, weight, and dimensions of the food product may be a factor in selecting a packaging device. Further, the gas transmission properties of the material used to construct the packaging device may be a factor in the selection of a packaging device. The desired internal atmosphere is one that extends the shelf-life of the food product during the distribution and storing of the food product and promotes the maintenance of the quality of the food product. It is further contemplated that the packaging device may be selected based on its cooking properties which in combination with the micro-perforations allows the food product to be cooked while still in the packaging device. The method of cooking may vary as previously stated to include steam cooking, cooking over an open flame, and the like. After selecting the packaging device, in step 615, the perishable food product is placed within and the packaging device is sealed about the food product. The seal may provide an integral connection or a releasable connection.

The method further contemplates the step of distributing the food product contained within the packaging device to a retail establishment. Once received by the retail establishment, the packaging device may then be placed on display. Display may occur within various environments, such as refrigerated, non-refrigerated, and the like without departing from the scope and spirit of the present invention.

Figure 9:
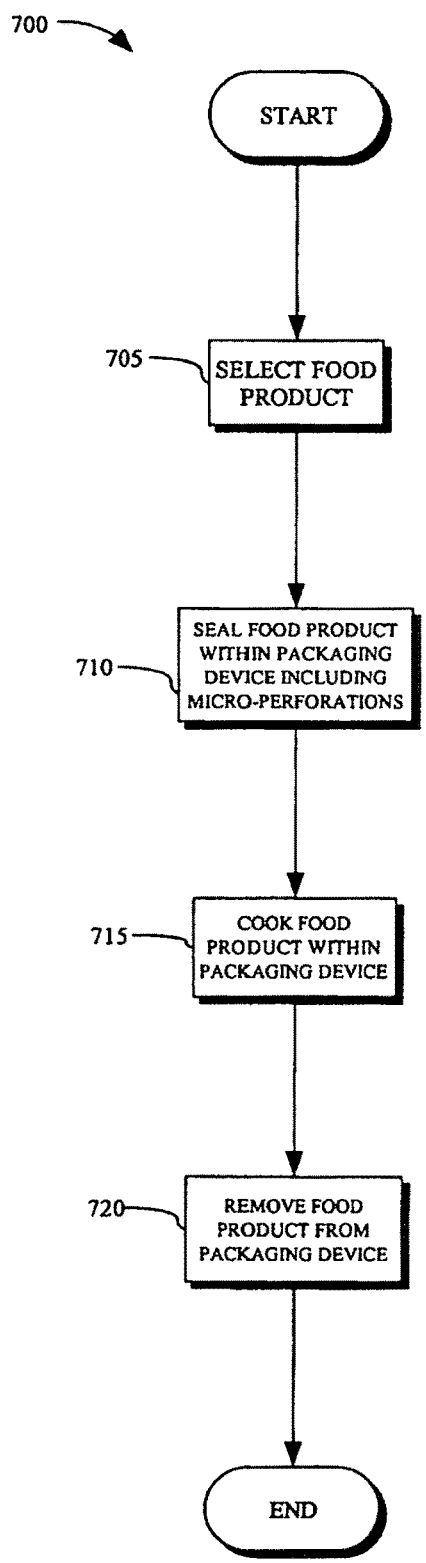
FIG. 9 is a block diagram illustration of a method of providing a Ready-to-Eat perishable food product in accordance with an exemplary embodiment of the present invention.

In FIG. 9, a method 700 of providing a Ready-to-Eat product is shown. The Ready-to-Eat product first includes the selection of a food product(s) in step 705. The food product(s) is then placed and sealed within a packaging device including micro-perforations for storage in step 710. The Ready-to-Eat product may be distributed and/or displayed in a retail environment in order to facilitate its use by a consumer. In step 715 the Ready-to-Eat product is cooked using one o f the various methods identified, such as steam cooking, convection oven cooking, barbequing, and the like. After cooking the packaging device may then be opened and the food product contents removed in step 720. In an additional step the user may consume the cooked food product removed from the packaging device including micro-perforations. Thus, the packaging device employed in a Ready-to-Eat product may provide a retailer an increased shelf-life which may increase sales and the consumer an increased ease of use and prolonged freshness of the perishable food products within.

For the packaging device, as described above, it is contemplated that various identifiers, such as an insignia, label, logo, sign, symbol, icon, moniker and other identifying marks may be included on the packaging device. These various identifiers may be integrally formed upon the web or may be connected to the web. Alternatively, connection of various identifiers may occur by adhesion through the use of glues, sealants, and the like as contemplated by those of ordinary skill in the art.

The packaging device of the current invention may assume various alternative configurations. These various alternative configurations may allow the packaging device of the current invention to be utilized for the storage of various food products, such as fresh and/or frozen food products. Further, the packaging device of the current invention may allow cooking of the various food products while contained within the packaging device and/or other purposes as may be contemplated by those of ordinary skill in the art. It is contemplated that the packaging devices shown in FIGS. 1-9 may include some or all of the various features that will be shown in FIGS. 10-22 and described below without departing from the scope and spirit of the present invention.

The packaging devices shown in FIGS. 10-22 and described below are exemplary packaging devices, which allow for the storage of fresh or frozen food products and the cooking of those food products while contained within the packaging devices. It is contemplated that the packaging devices of FIGS. 10-22 may include some or all of the features of the packaging devices shown in FIGS. 1-9 and described above. In the preferred embodiments shown in FIGS. 10-22 the packaging devices include a venting system that allows for the release of pressure build-up during a cooking process. This capability is provided to the packaging devices of the current invention in various manners.

The venting system may be variously configured and employed within the exemplary embodiments described above and below. For instance, the venting system may be configured as a plurality of micro-perforations covered by adhesive that may be used in the construction of the packaging device, through an adhesive strip, multiple adhesive strips, a base film, multiple base films, and the like. It is further contemplated that "slits" (an area of the packaging device wherein multiple micro-perforations are proximally located to one another) or other alternative configurations of an opening that allows for the venting of steam during a cooking process may be employed with the various exemplary packaging device embodiments described herein and fall within the scope and spirit of the venting system of the current invention.

Figure 10:
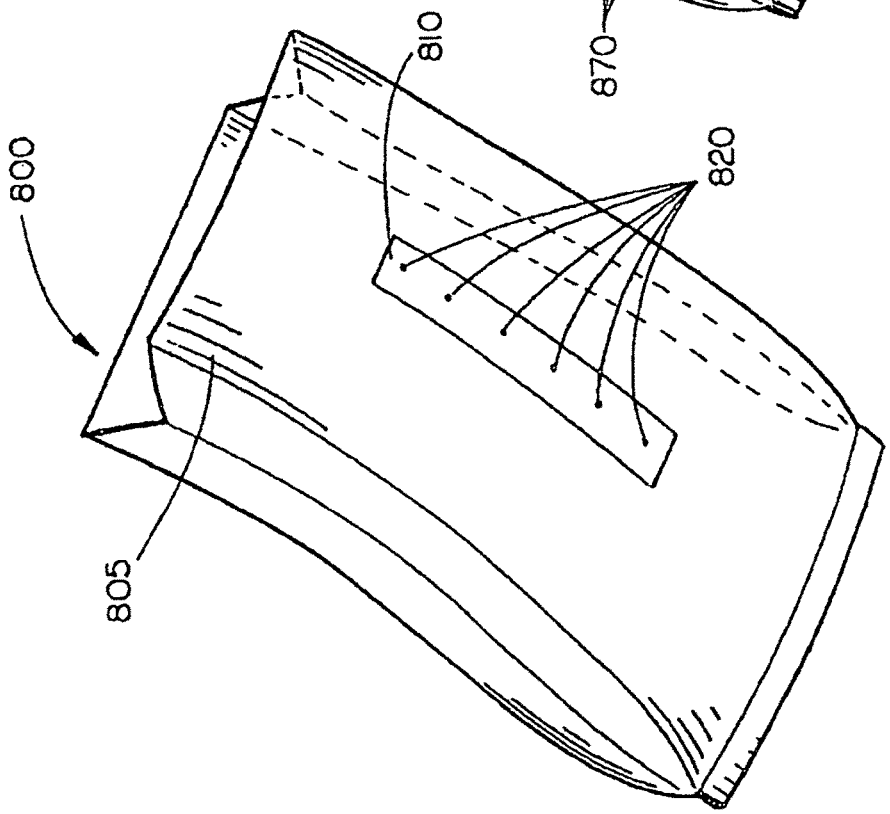
FIG. 10 is an isometric illustration of a packaging device including micro-perforations in accordance with an exemplary embodiment of the present invention and providing a venting system that allows for cooking a food product in the packaging device where the venting system consists of two base films, one of which is in the form of a strip of material, bound together and containing micro-perforations.

A packaging device 800 is shown in FIG. 10 that allows frozen food products to be stored and cooked within. In a preferred embodiment, the packaging device includes a first base film 805 and a second base film 810 bonded together through lamination and in a bag configuration. The packaging device 800 is constructed of heat sensitive polymers and includes a venting system as will be described below. The venting system of the packaging device 800 provides a venting system for releasing pressure during a cooking process (i.e., steam cooking). Thus, in combination with the ability of the packaging device 800 to store frozen food products within and maintain the frozen food products in a frozen state for periods of time, it is also understood that the packaging device 800 includes a venting system that provides it with cooking properties that allow it to be used for the distributing, storing and cooking of frozen food products. In the current embodiments, the first base film 805 may be made from a cast poly-propylene (CPP) that is bonded (laminated) to the second base film 810, which is made from a polyethylene terephthalate (PET). It is to be understood that the first and second base film may be constructed from various materials, such as any of those previously mentioned.

The first base film 805 may be constructed generally in a standard bag configuration. For instance, the first base film 805 may provide a web where the sidewall is constructed from connecting the ends of a continuous piece of material, thereby constructing opposing sidewalls of a bag. Further, the top and bottom edges may be joined together and may include gusseting. This connection of the continuous piece of material and joining of the edge(s) provides the bag with an outer surface exposed to an exterior (ambient) environment and an inner surface which defines an interior space allowing for the storage of food products within and between the opposing sides of the inner surface. The packaging device 800 or "bag" may be one hundred twenty one millimeters (121 mm) wide with additional gusset width of approximately thirty-seven millimeters (37 mm) on each side and three hundred fifty millimeters (350 mm) long. Other dimensional specifications for a steam cooking capable packaging device that stores frozen food products may be employed as contemplated by those of ordinary skill in the art.

The second base film 810 may be constructed in the configuration of a "strip" of material. The strip may have certain dimensional characteristics which allow it to be connected with the first base film 805 in such a manner that it provides an integral overall appearance. For instance, the strip may be one-quarter inch (¼") wide and have a length which corresponds to the length of the first base film 805. It is to be understood that the dimensional characteristics of the strip may vary without departing from the scope and spirit of the present invention. For instance, the strip may include a pre-determined length that is shorter or greater than the length of the first base film 805 and may have a width less than or greater than one-quarter inch wide.

To provide the packaging device 800 with proper cooking properties a venting system is included. In a preferred embodiment, before the two base films are bonded together the first base film 805 is provided a plurality of micro-perforations 820 (opening) in positions along the first base film 805, as shown in FIG. 12, that corresponds to the position of the bonding of the second base film 810 with the first base film 805. The bonding of the second base film 810 to the first base film 805 occurs using a lamination process where a lacquer is applied for sealing the first and second base films. In the alternative, various sealing techniques may be employed, such as using various adhesives, sealing agents, or epoxy compounds to affect the seal as contemplated by one of ordinary skill in the art may also be utilized. Thus, in the current embodiment, the plurality of micro-perforations 820 providing the venting system along a side of the first base film 805 are sealed by the lamination of the second base film 810 over the micro-perforations 820. It is contemplated that the second base film 810 may cover less than all of the plurality of micro-perforations 820 by its bonding to the first base film 805.

It is contemplated that the venting system provided in the first base film 805 may be a "slit" (multiple micro-perforations constructed in varying proximal positions relative to one another) that may be significantly continuous along the first base film 805 and that the width and length of the slit in the first base film 805 may vary. For instance, the slit may run the entire length of the bag or may extend only a partial distance along the side of the bag. The slit may extend from a starting point that is disposed proximal to or at an edge of the bag or the slit may be positioned in a generally central portion of the side of the bag. Additionally, the slit may have a width ranging from one millimeter (1 mm) to one half inch (½"). It is contemplated that various other slit widths as contemplated by those skilled in the art may be constructed within the side of the bag. Further, the dimensional characteristics of the second base film "strip" 810 used in sealing over the venting system, in the current embodiment it is slits, may vary to accommodate the varying dimensional characteristics of the venting system (i.e., slit). For example, the strip 810 may have a length generally shorter than the length of the bag.

It is further contemplated that the venting system may be constructed as a plurality of slit openings or a plurality of micro-perforations in the first base film 805. Thus, the second base film 810 may be a continuous strip that seals over the plurality of slit openings or micro-perforations or may be constructed as a plurality of strips for sealably connecting with the first base film 805 over the plurality of slit openings or micro-perforations. It is contemplated that the second base film 810 may cover less than all of the continuous or plurality of slits or micro-perforations by its bonding with the first base film 805. The sealing of the continuous strip or plurality of strips of the second base film with the first base film may occur using a lamination process as described above. The continuous strip or plurality of strips of the second base film may include one or more micro-perforations of various dimensional characteristics and the lacquer that seals the continuous strip or plurality of strips of the second base film to the first base film may include similar features, such as one or more micro-perforations or directed channels, and properties as have been previously described and will be described below herein.

Figure 16A:
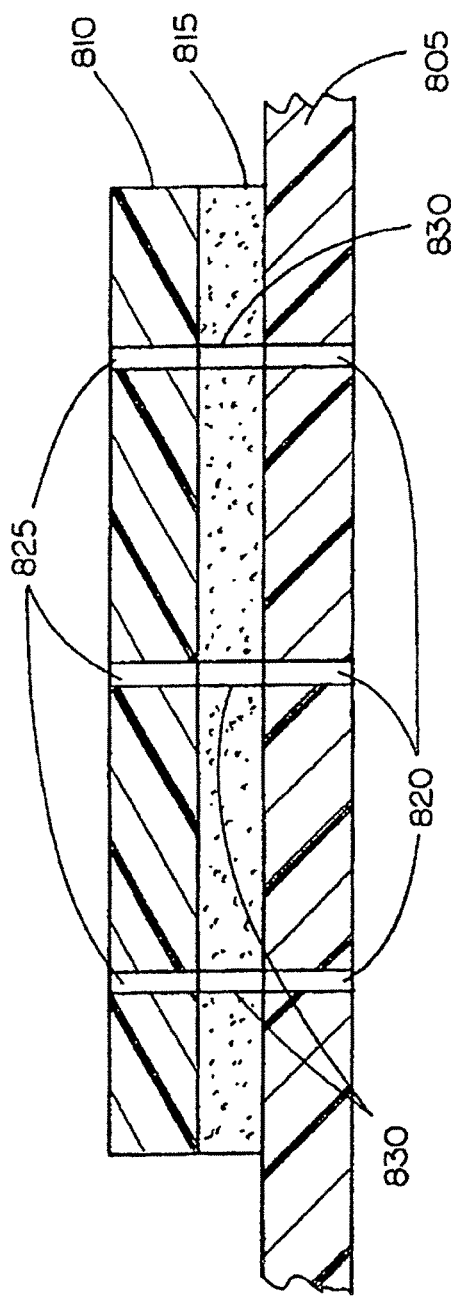
FIG. 16A is a cross-section of the two base films as shown on FIG. 13, where the adhesive strip connecting both base films contains micro-perforations that align with the micro-perforations of both base films.

The seal between the first and second base film may be constructed in any manner similar to those described previously. Thus, an adhesive strip 815, as shown in FIG. 12, may be formed between the first and second base films to provide a sealed connection. The structural degradation of the adhesive strip 815 may allow for communication between the micro-perforations contained within the first base film and an outside atmosphere. It is contemplated that the adhesive strip 815 may also include a one or more micro-perforations, as shown in FIG. 16A, the total number of which may be similar to or different from the number of micro-perforations contained within the first base film. The one or more micro-perforations included within the adhesive strip may include similar dimensional characteristics or be different from the dimensional characteristics of the micro-perforations contained in the first base film. It is contemplated that the second base film 810 may cover less than all the micro-perforations that may be included within the adhesive strip.

It is contemplated that the second base film 810 may include a plurality of micro-perforations 825 having various dimensional characteristics, as shown in FIGS. 13, 14, and 15. For example, the second base film 810 may include micro-perforations 825 having a diameter of one hundred twenty microns (120μ) each. It is to be understood that the number and dimensional characteristics of the micro-perforations included on the first and/or second base films may vary to accommodate the use of the packaging device 800 with various food products, either fresh or such as frozen food products. It is contemplated that the adhesive strip 815 or various other bonding agents utilized for bonding the second base film 810 to the first base film 805 may cover less than all of the micro-perforations 825 included within the second base film 810.

The number of micro-perforations included on the first and second base films may be similar or each base film may contain a different number of micro-perforations. The dimensional characteristics (i.e., diameter size, shape) of the micro-perforations on either the first or second base film may vary. For example, the micro-perforations 820 included in the first base film 805 may have a smaller diameter than the micro-perforations included in the second base film 810, as shown in FIG. 15. Alternative configurations for the micro-perforations within the first and/or second base films may be employed without departing from the scope and spirit of the present invention.

As shown in FIG. 13, the plurality of micro-perforations constructed in the first and second base films may be generally aligned in a corresponding location with one another when the second base film is adhered to the first base film. Thus, when the adhesive strip degrades during the cooking process the micro-perforations in the first and second base films allow for the steam to vent through them to the outside atmosphere. Alternatively, the positioning of the micro-perforations in the first base film may not align with the positioning of the micro-perforations in the second base film when the second base film is sealed to the first base film. However, during the cooking process the micro-perforations allow the steam to vent to the outside atmosphere.

As seen in FIG. 16A, where the adhesive strip includes one or more micro-perforations, in various proximal relation to one another, 830 it is contemplated that they may be generally aligned with the micro-perforations of both the first and second base film or they may not be so aligned. It is further contemplated that the micro-perforations 830 within the adhesive strip may be in a sealed or "closed" position until the steam from the cooking process allows for the degradation of the sealant material and "opens" the micro-perforation within the adhesive strip. In an alternative embodiment, the "alignment" of the micro-perforations in the first and second base film may be accomplished by including within the adhesive strip directed channels 840 (communication passage(s)), as shown in FIG. 14. The directed channels may communicate one or more micro-perforations within the first base film with one or more micro-perforations within the second base film. It is further contemplated that the directed channels may communicate one or more micro-perforations in either the first or second base film. For instance, the one or more micro-perforations in the first base film may align with one or more directed channels. The directed channels may provide a directed channel to the outside environment. Alternatively, the directed channels may simply communicate the one or more micro-perforations with an interior position of the adhesive sealant. This may promote and or control the steam release characteristic of this venting system.

By way of example, on cooking, the pressure inside the package increases to a point where the lacquer begins to degrade and at least partially starts to break open. The lacquer seal used may be engineered with various structural characteristics which allow it to resist premature or delayed structural breakdown during the cooking process, thereby ensuring that the steam is allowed to escape and be vented at a particular level of pressure build-up. In the current embodiment of the present invention the degradation of the lacquer occurs in a uniform manner. It is contemplated that the degradation characteristics of the lacquer may be non-uniform, providing a variance to the rate of lacquer degradation at particular points along the lacquer strip that is sealing the first and second base films. This degradation of the lacquer exposes the interior atmosphere of the packaging device 800 to the plurality of micro-perforations 820. Upon exposure of the plurality micro-perforations 820 the steam within the interior of the packaging device 800 is allowed to escape through the outlets provided by the plurality of micro-perforations 820. Therefore, the micro-perforations allow the packaging device to retain its steam cooking properties.

Figure 16B:
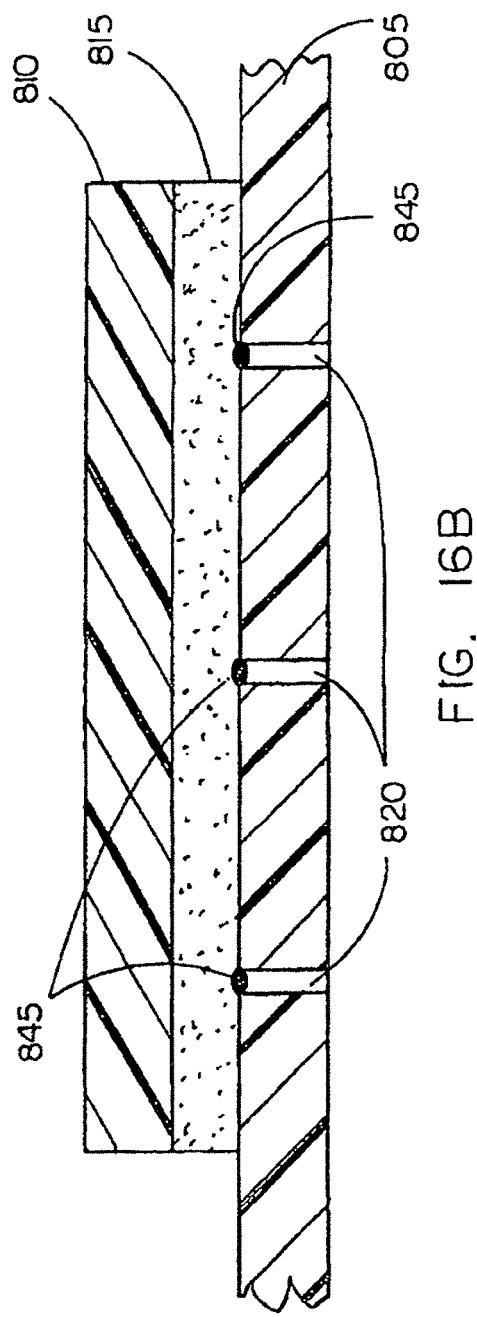
FIG. 16B is a cross-section of the two base films as shown on FIG. 13, where the micro-perforations are placed on the first base film and include venting points capable of degrading prior to other areas within the adhesive joining the two base films.

It is contemplated that the "seal" (adhesive strip/lacquer) may be configured with various features to provide an outlet in various forms, such as the directed channels 840 (communicating passage), shown in FIG. 14 which may direct the flow of the escaping steam to a single micro-perforation or a series of micro-perforations which allows the steam to vent. Another feature may be the inclusion of one or more venting points 845, as shown in FIG. 16B, that is capable of degrading prior to other areas within the lacquer and my open to the outside atmosphere, further micro-perforations contained within the adhesive strip and/or second base film, or the directed channel. In a preferred embodiment, the venting points allow the steam to be communicated through the lacquer to one or more micro-perforations and then be exhausted into the outer environment outside the bag. Alternatively, multiple venting points and directed channels capable of directing the flow of steam created by cooking of the frozen food product to one or more micro-perforations may be included. One or more barriers may also be included within the seal provided to the packaging device as will be more fully described below.

This laminated strip configuration described above allows the packaging device 800 to be used during steam cooking (such as cooking in a microwave oven) without significantly altering the steam cooking properties of the web. The steam cooking properties may include various structural integrity characteristics of the base film(s) material, such as heat resistance, moisture resistance, interior heat build-up and the like. The thickness of the material (base film) used in the construction of the packaging device may also affect the storage and cooking properties of the packaging device. The current invention identifies that there is a relationship between the size of the micro-perforations and the thickness of the base film(s) and that this relationship may affect the storage capabilities of fresh produce within a packaging device of the current invention. It is also contemplated that the steam cooking properties of the packaging device are affected by the thickness of the base film(s) employed.

Figure 11:
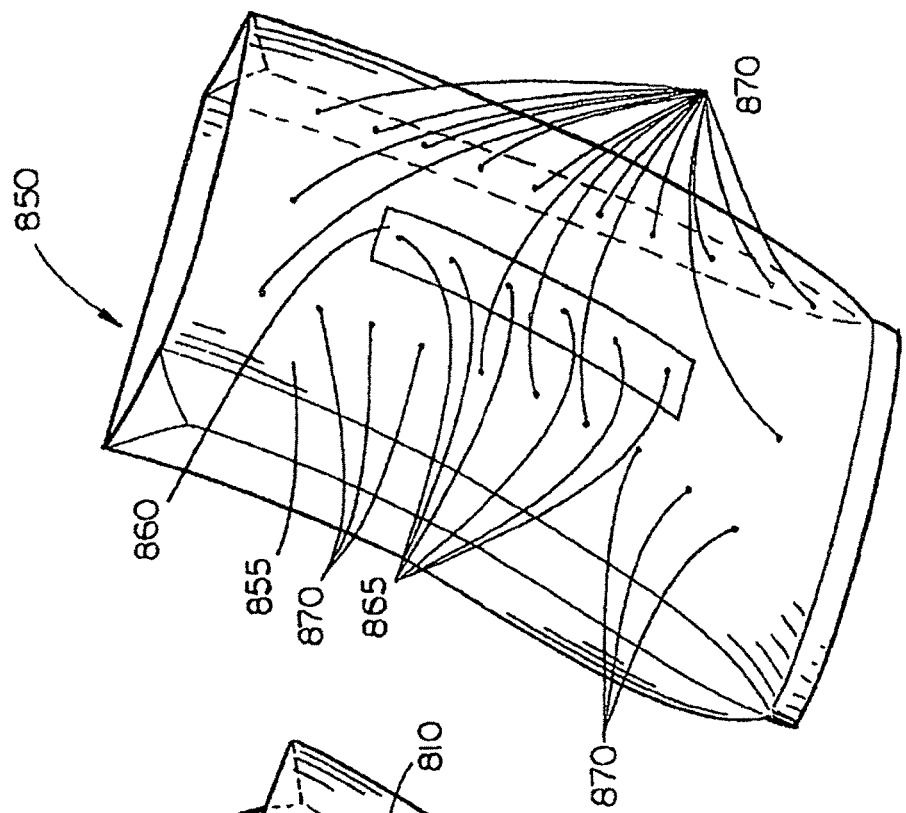
FIG. 11 is an isometric illustration of a packaging device including micro-perforations in accordance with an exemplary embodiment of the present invention and providing a venting system that allows for cooking a perishable food product in the packaging device as shown in FIG. 10 where the micro-perforations are part of both base films and on other portions of the packaging device outside the strip of material of the second base film.

In an alternative embodiment, shown in FIG. 11, a packaging device 850 for fresh food products may be similar in every respect to the packaging device 800 described and shown in FIG. 10, except a first base film 855 of the packaging device in FIG. 11 may include one or more micro-perforations 865 that are sealed by the bonding of a second base film 860 with the first base film and one or more micro-perforations 870 that are not sealed by the bonding of the second base film to the first base film. The inclusion of the one or more micro-perforations that are not sealed by the bonding of the second base film with the first base film allows for the respiration process of the fresh food product to occur, as described previously.

It is contemplated that alternative packaging configurations, such as that shown in and described in the instant specification, may employ the micro-perforations without the use of any adhesive material to act as self-regulating steam release valves for the package. For example, when a microwavable eight ounce (8 oz.) package is formed from a single laser micro-perforation lane with steam release valve micro-perforations of ninety microns (90μ) at five (5 mm) or ten (10 mm) millimeters apart, the perforations expand during two (2) minute microwave cooking (the size may change from ninety (90μ) to two hundred and fifty (250μ) microns based on the pressure build-up caused by the cooking process) and allow all the steam to release through the perforations while protecting the cooking properties of the package. Thus, the steam release valve micro-perforations act as a steam release valve dispensing of the need for pressure sensitive adhesive materials. It is contemplated that the perforations used in this fashion can range in size, amount and separation. The package may contain a single or multiple lanes of perforations. In addition, the perforations can be spaced at different intervals and the lanes, if multiple lanes are used, can be spaced at different intervals.

In an alternative exemplary embodiment, the steam release valve micro-perforations may be constructed to provide a specified range of expansion during the cooking process independent of the pressure build-up created within the interior space of the packaging device during the cooking process. For example, micro-perforations may be constructed to expand from an initial size of fifty (50μ) to an expansion size of three hundred (300μ) microns. Other ranges of initial sizes and expansion sizes of the steam release valve micro-perforations are contemplated and may be employed without departing from the scope and spirit of the present invention. It is contemplated that the steam release valve micro-perforations, providing the steam release valve functionality, described above may be employed with any of the bag configurations described throughout the instant specification. Therefore, this functional characteristic may be employed with packaging devices that store fresh or frozen food products.

Figure 17A:
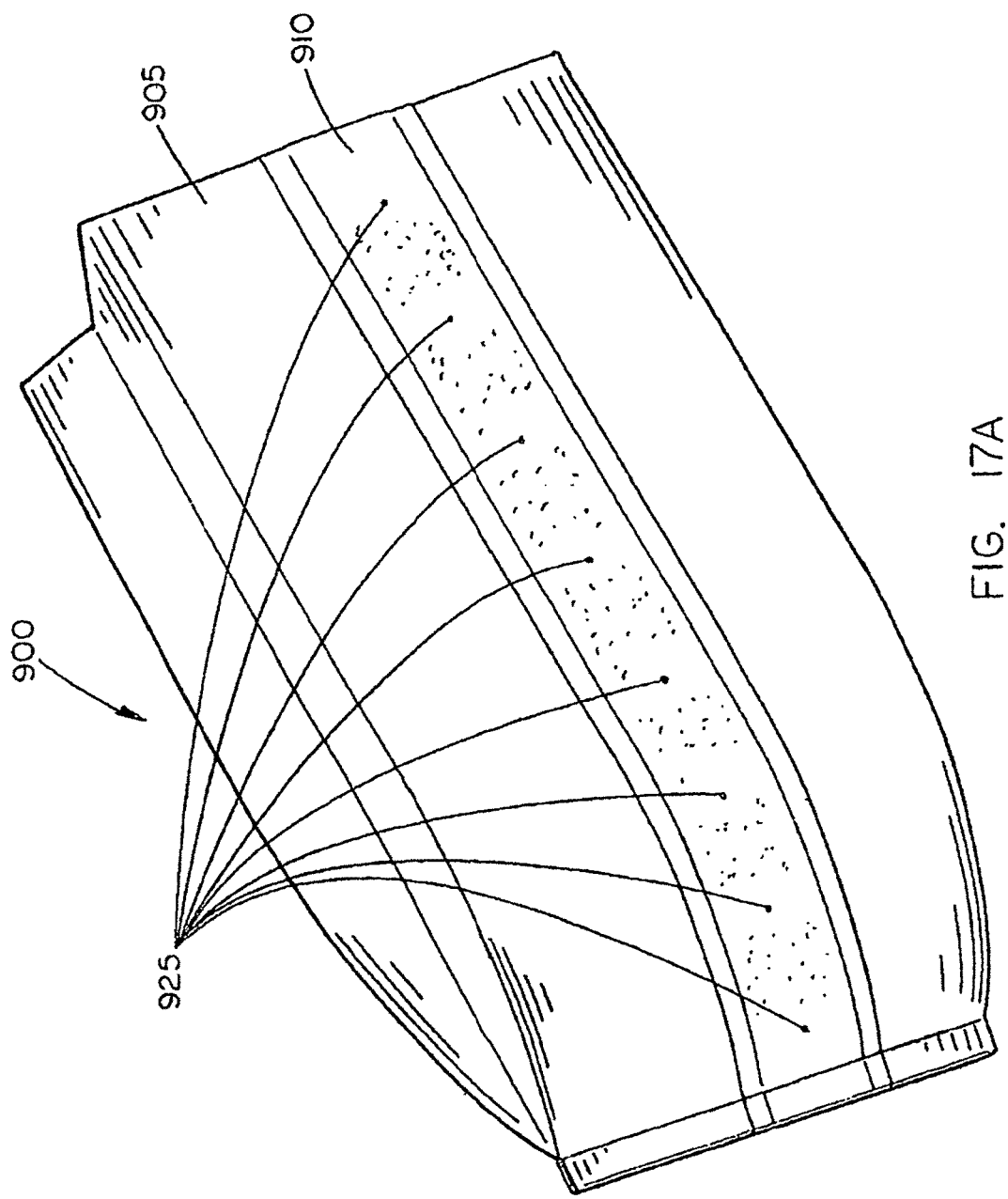
FIG. 17A is an isometric illustration of a packaging device including micro-perforations in accordance with an exemplary embodiment of the present invention and providing a venting system that allows for cooking a perishable food product in the packaging device where the venting system consists of a bonded base film forming a fold-over flap and the micro-perforations are contained in the fold-over flap.
Figure 17B:
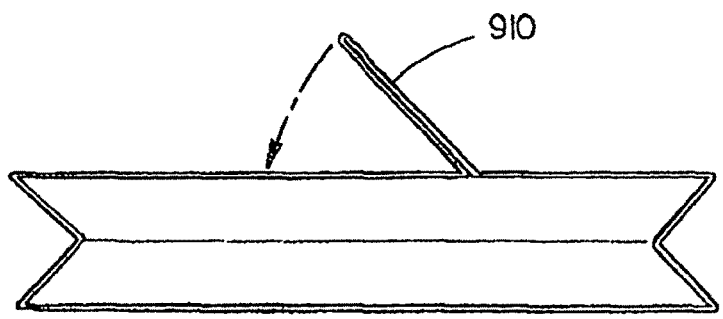
FIG. 17B through F are cross-sections of the different configurations that may be utilized in a packaging device as shown on FIG. 17A.
Figure 17C:
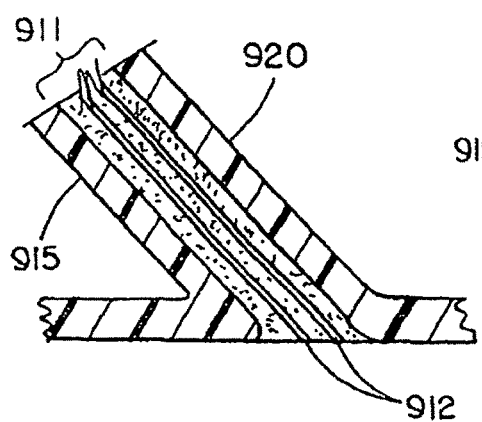

In an exemplary embodiment, a packaging device 900 is configured as a standard bag, previously described, but also includes the bonding of a base film 905 forming a fold-over flap 910, as shown in FIGS. 17A, 17B, 17C, 17D, 17E, and 17F. The fold-over configuration, wherein the base film 905 is sealed in a manner that provides a fold-over flap 910 created by the boding of a first end 915 and a second end 920 of the base film 905. The fold-over flap 910 may be provided by an adhesive seal/strip 911 that starts at the lowest point of the fold and then extends at least partially up the fold, as shown in FIGS. 17C-F. The materials, technologies, and techniques employed to provide the sealed fold-over flap 910 may vary as described throughout the instant specification. It is contemplated that a venting system may be configured within the packaging device 900, for instance, the adhesive strip 911 may provide a venting system to the packaging device 900 by including a plurality of micro-perforations 912 in the adhesive strip 911 to allow the packaging device 900 to vent steam during a cooking process, as shown in FIG. 17C. Alternatively, the venting system employed may vary, including such features as a slit or multiple slits within the adhesive strip 911. The adhesive strip may be configured to include various features, such as directed channels, barriers, and venting points, as described throughout the instant specification.

Figure 17D:
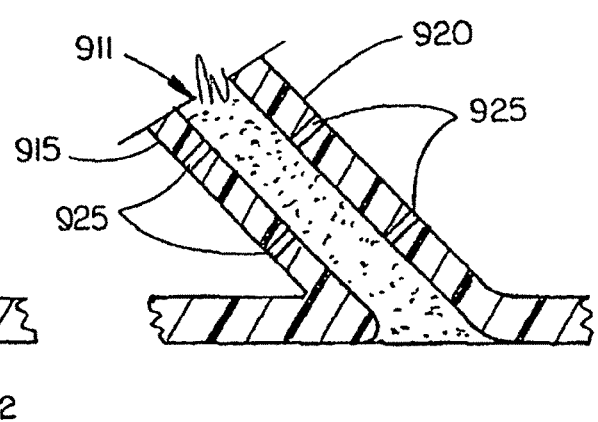

As shown in FIG. 17D, micro-perforations 925 may be included within either or both the first end 915 and the second end 920. The adhesive strip 911 may or may not include micro-perforations for communicating with those included in the first and/or second ends. As described above with respect to FIGS. 10-16, the number, dimensional characteristics, and alignment of the micro-perforations contained within the first end 915, second end 920, and/or adhesive strip 911 may vary.

Figure 17E:
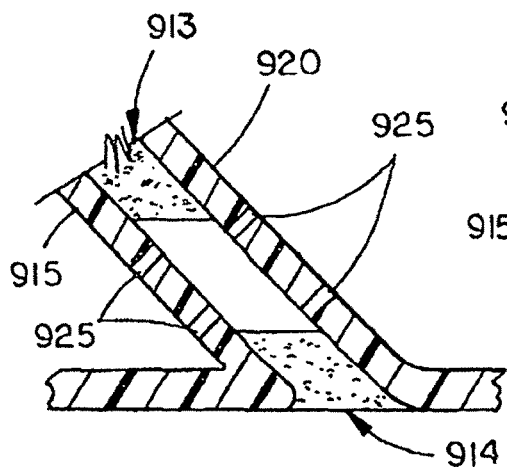

In another embodiment, shown in FIG. 17E, micro-perforations 925 may be included within either or both the first end 915 and second end 920 in a position that is "behind" the location of at least one seal of the two ends. In the current embodiment, the first and second ends are bonded together by a first adhesive strip 914 and a second adhesive strip 913. The first and second adhesive strips forming a space between them. Within the space between the first and second adhesive strips one or micro-perforations within either or both the first and second ends of the packaging device 900 may be included. It is contemplated that the adhesive strip may be employed at various locations along and up the fold-over flap 910 and that these adhesive strips may include varying characteristics and features, such as those described throughout the instant specification and including but not limited to resistance to degradation to higher temperatures/pressure levels. Upon cooking, as the pressure builds, the first adhesive strip 914 in front of the micro-perforations degrades and the micro-perforations contained in the first and/or second ends are exposed to the interior environment of the packaging device. The second adhesive strip 913 may include properties which allow it to resist degradation and thus, act as a "stop" against the rising steam forcing it to vent through the micro-perforations. It is contemplated that the first 914 and second adhesive strip 913 may also include micro-perforations to allow for the venting of steam. It is to be understood that the various configurations, dimensional characteristics, positioning, and other alternatives described throughout the instant specification for the micro-perforations, adhesive seal, and the packaging device may be employed with the current exemplary embodiment.

Figure 17F:
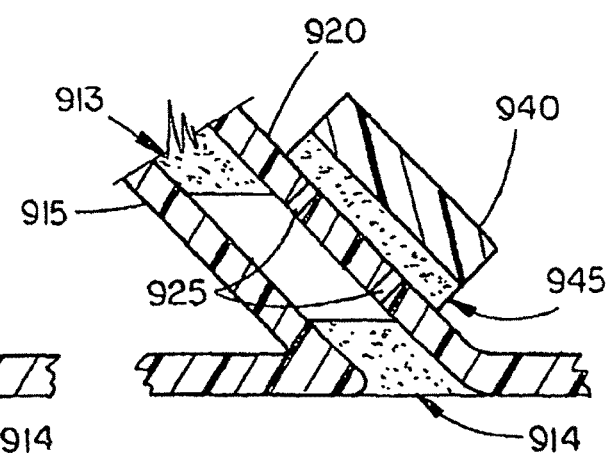

In the embodiment shown in FIG. 17F, a second base film 940 may be sealed with the first base film in various locations including on the fold-over flap 910. For example, the second end 920 may be bonded with a second base film 940. The bonding may occur through the use of various materials and bonding/sealing techniques as have been previously described. Thus, an adhesive strip 945 may be employed to bond the second base film 940 with the second end 920 of the base film 905. It is to be understood that the second base film 940 may be bonded with the packaging device 900 employing any of the bonding embodiments, as shown in FIGS. 17A-D. The second end 920 may include one or more micro-perforations and the second base film may be bonded in a position which allows the second base film to cover the one or more micro-perforations. During the cooking process, the steam may vent through the micro-perforations in the second end 920, thereby causing the adhesive to degrade and allowing the steam to vent to an outside atmosphere.

It is further contemplated that the adhesive and/or the second base film may include one or more micro-perforations which allow for the venting of steam during the cooking process. The number, dimensional characteristics, features, and configurations of the micro-perforations contained within the adhesive strip and second base film may vary as described throughout the instant specification to allow for the venting of the steam during the cooking process. Thus, it is contemplated that the steam escaping through the second end 920 may simply degrade the adhesive and thus be able to vent to the outside atmosphere or be communicatively connected through the micro-perforations in the second base film to the outside atmosphere. Alternatively, the adhesive may include one or more directed channels through which escaping steam from the micro-perforations in the second end 920 may be directed and allowed to vent directly to the outside atmosphere or the micro-perforations included within the second base film. These various exemplary embodiments may include features similar to those described throughout herein without departing from the scope and spirit of the present invention.

Figure 18:
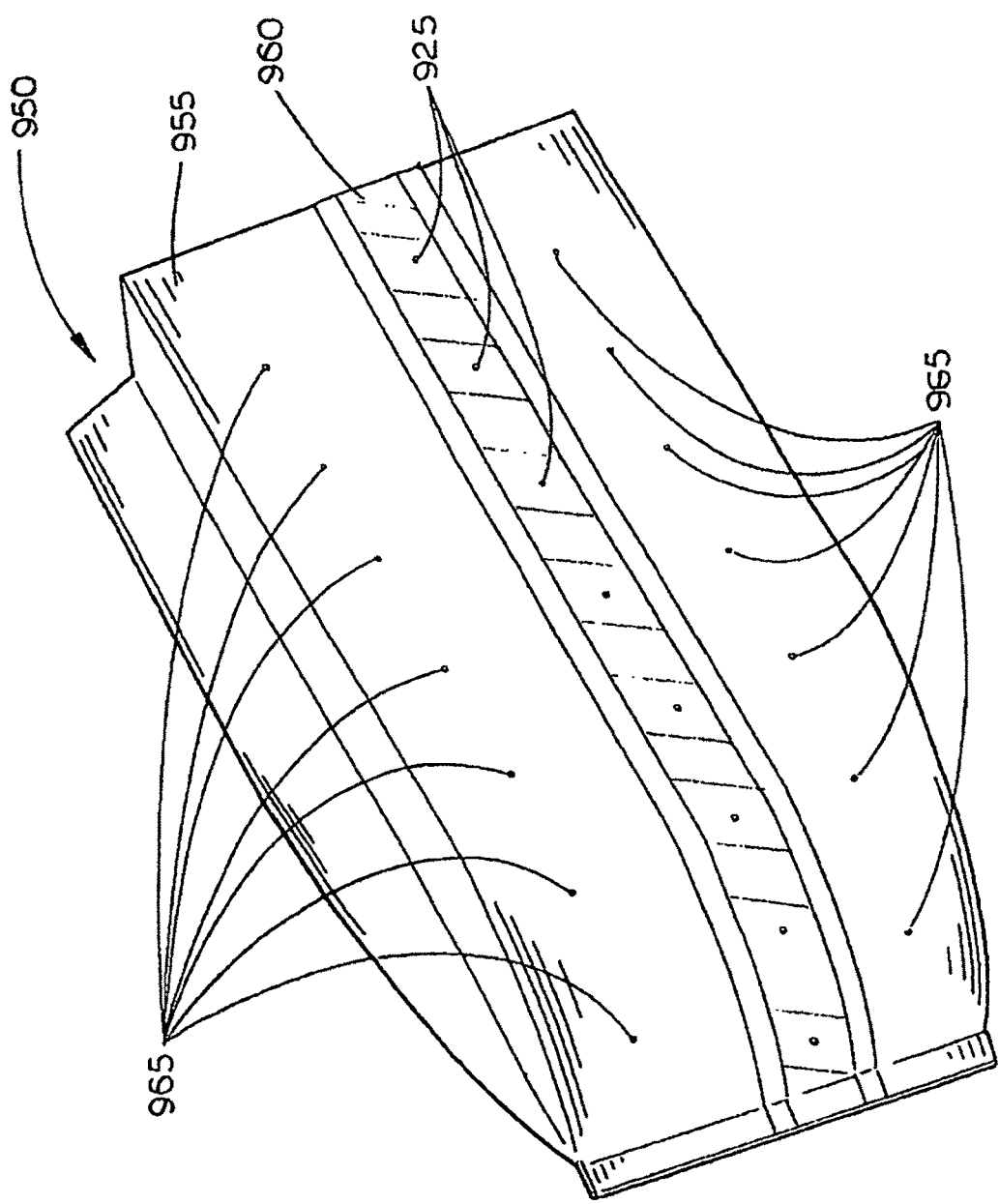
FIG. 18 is an isometric illustration of a packaging device as shown in FIG. 17A, where the micro-perforations are contained in the fold-over flap and other areas of the packaging device.

In an alternative embodiment, shown in FIG. 18, a packaging device 950 for fresh food products may be similar in every respect to the packaging device described and shown in FIGS. 17A-F, except a base film 955 of the packaging device in FIG. 18 may include the one or more micro-perforations 925 of a fold-over flap 960 and one or more micro-perforations 965 that are not within the fold-over flap. The inclusion of the one or more micro-perforations 965 that are not within the fold-over flap allows for the respiration process of the fresh food product to occur, as described previously.

In an exemplary embodiment, a packaging device 1000, shown in FIGS. 19A, 19B and 19C, includes a base film 1005 sealed upon itself, wherein a first edge 1010 is sealed with a second edge 1015 of the base film 1005. It is contemplated that the sealing of a base film to itself may occur in various manners and that the base film material may be of varying dimensional characteristics and the like. Such alternative configurations are contemplated and fall within the scope and spirit of the present invention. The first edge 1010 and second edge 1015 may be sealed by the use of a lamination process, said process may be similar to that previously described or utilize various other techniques and technologies as contemplated by those of ordinary skill in the art. It is contemplated that various sealing techniques may be employed, such as using various adhesives, sealing agents, or epoxy compounds to effect the seal. It is further contemplated that the base film 1005 may be constructed in a standard bag configuration or alternative configurations. Thus, base film 1005 may include various "sealed" areas to provide the packaging device 1000 with an interior atmosphere on one side and be in contact with an exterior (outside) atmosphere on the other side.

In the current embodiment, the lamination process creates an adhesive strip/lacquer seal 1020 that seals the first edge 1010 to the second edge 1015. Contained within the adhesive strip 1020 is a plurality of micro-perforations 1025. Thus, a venting system is configured within the adhesive strip 1020 by the inclusion of the plurality of micro-perforations 1025. The adhesive strip 1020 may allow the micro-perforations 1025 to be maintained in an "open" configuration, shown in FIG. 19B, allowing for the respiration of the food products within to occur. This configuration of the micro-perforations may allow them to provide the "steam release valve" functional characteristic, as described above. This ability to allow for respiration is advantageous for the storing of fresh food products within the packaging device shown in FIG. 19B. Alternatively, the adhesive strip 1020 may form an airtight seal of the first base film 1005 wherein the micro-perforations 1025 are in a "closed" configuration, FIGS. 19A and 19C, thereby not allowing for the respiration of the food product within and enabling the packaging device 1000 to be used for the storage of various food products, such as frozen food products. The airtight seal that may be provided by the adhesive strip 1020 is capable of maintaining its integrity allowing food products to advantageously respire as previously described or be maintained for indefinite periods, particularly in a frozen state. The dimensional characteristics of the adhesive strip 1020 may be varied to accommodate various packaging device configurations. It is contemplated that the lamination process may create an essentially integral web for the packaging device 1000. It is further contemplated that the configuration of the packaging device 1000 may vary to include multiple "seals" of the base film. These multiple seals may be used to form the shape of the packaging device or include functional aspects as will be described below.

The number of micro-perforations 1025 included within the .adhesive strip 1020 may vary and the dimensional characteristics of the micro-perforations 1025 may be similar throughout or may vary amongst each other. The "sealing" effect of the lacquer or other materials used to form the adhesive strip 1020 also provide for the sealing of the plurality of micro-perforations 1025, configuring the micro-perforations in the "closed" position. The adhesive strip 1020 may be engineered with various structural and/or chemical characteristics which allow it to resist premature or delayed breakdown during the cooking process, thereby ensuring that the steam is allowed to escape and be vented at a particular level of pressure build-up. Thus, whether fresh food products or frozen food products are being stored within the packaging device of the current invention, the packaging device maintains its advantageous food cooking capabilities and allows for the cooking of any food products while stored within.

As the lacquer degrades during the cooking process it may expose and allow for the opening of the plurality of micro-perforations 1025. This opening exposes the interior atmosphere of the packaging device 1000 to the plurality of micro-perforations 1025 and the outside environment. Where the adhesive strip 1020 includes the micro-perforations in an "open" position as described above, the steam is allowed to vent to promote the cooking process. Upon exposure and opening of the plurality micro-perforations 1025, the steam within the interior of the packaging device 1000 is allowed to escape through the outlets provided by the plurality of micro-perforations 1025. Therefore, the micro-perforations allow the packaging device to retain its steam cooking properties.

In the current embodiment of the present invention the degradation of the lacquer during the cooking process occurs in a uniform manner. It is contemplated that the degradation characteristics of the lacquer or any sealant utilized may be non-uniform, providing a variance to the rate of degradation at particular points/positions/locations throughout the adhesive strip. The variance provided to the degradation characteristics of the seal may be accomplished utilizing standard practices as are well known to those of ordinary skill in the art. Such variance in the sealant properties and characteristics may be realized within any of the embodiments of the present invention.

It is contemplated that the lacquer seal or the various other materials used to form the adhesive strip in any of the embodiments of the present invention may be constructed with a venting system that provides one or more outlets in various forms. For example, a directed channel (communicating passage), as previously described and shown, which may direct the flow of the escaping steam to a single micro-perforation or a series of micro-perforations which allows the steam to vent. In a preferred embodiment, such as that shown in FIG. 20A, a base film 1105 has a first edge 1110 and a second edge 1115 connected by a lacquer (adhesive strip) 1120 that is constructed with a plurality of venting points 1125. The venting points 1125 may be capable of degrading prior to other areas within the lacquer and opens to a directed channel 1130, which allows the steam to be communicated through the lacquer to one or more micro-perforations 1140 and then be exhausted into the outer environment outside the bag. The one or more micro-perforations 1140 may be sealed (secondary seal) by the lacquer requiring another degradation process to occur before the exhausting of the steam. The strip, venting point, and secondary seal may be given various structural and/or chemical characteristics to affect its degradation rate and thereby affect the rate at which the steam is exhausted. Alternatively, the lacquer may be constructed to include multiple venting points communicatively coupling with multiple directed channels capable of directing the flow of steam created by cooking of a food product to one or more micro-perforations.

The positioning of the micro-perforations within the adhesive strip for any of the embodiments of the present invention may be separated by a plurality of barriers 1150, as shown in FIG. 20B, which provide for a separation distance between each of the micro-perforations. It is contemplated that the separation distance between the micro-perforations and thus the dimensional characteristics of the plurality of barriers may vary. For instance, the separation distance may range from thousandths of an inch to several inches and the dimensional characteristics of the plurality of barriers may vary in size, number, and shape.

The plurality of barriers 1150 may be constructed of various materials and configurations. For instance, the adhesive strip may include barriers with a thickness dimension that is greater than the thickness dimension given the lacquer used to seal the plurality of micro-perforations. The thickness dimensions given the barrier may be a function of a thickness ratio between the barrier and the dimensions of the micro-perforations. Alternatively, the thickness dimension given the barriers may be a function of the material used for constructing the packaging device or the type of food product to be contained with a particular packaging device. It is further contemplated that the barriers may include secondary materials or compounds which provide advantageous structural/chemical characteristics. For instance, the barriers may include compounds that enable them to resist degradation up to higher pressure level/temperatures than that allowed by the lacquer used to seal the micro-perforations. Alternatively, the barriers may include structural apparatus that reinforce and provide increased resistance to structural degradation at higher pressure levels and/or temperatures.

Figure 21A:
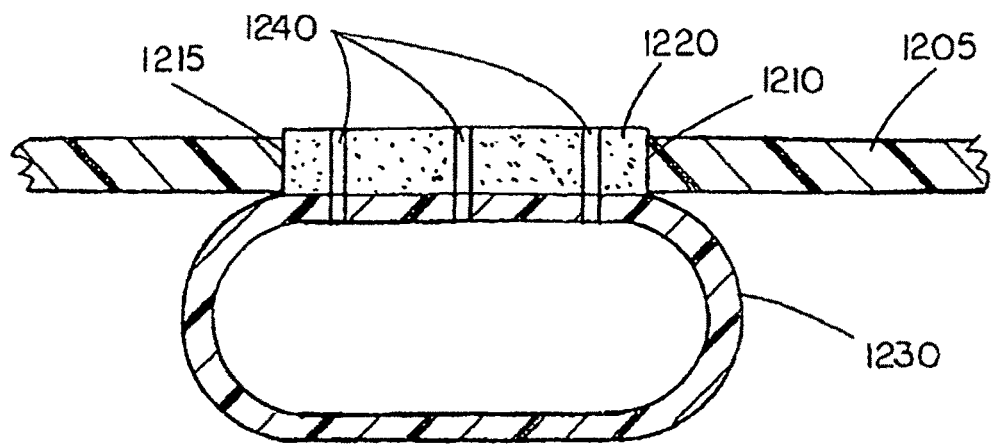
FIGS. 21A through 21C are cross-sections of secondary seals to be used in accordance with an exemplary embodiment of the present invention.
Figure 21B:
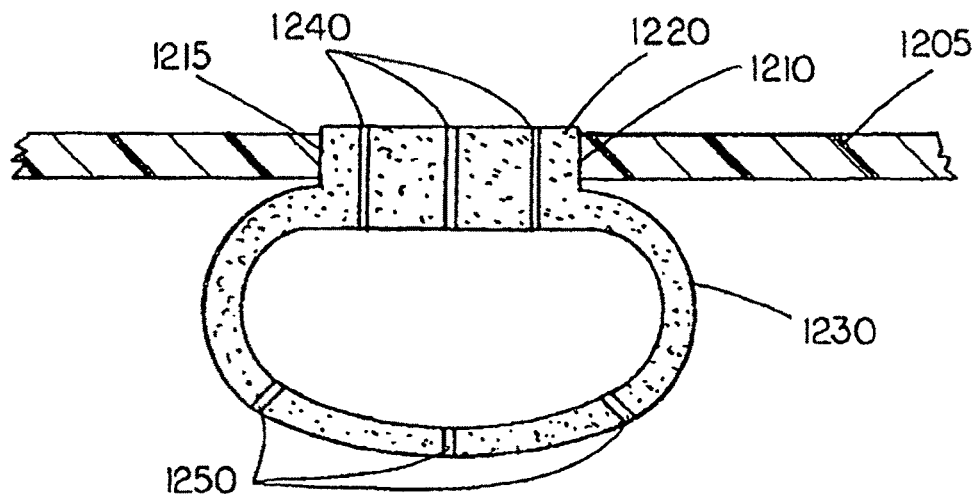
Figure 21C:
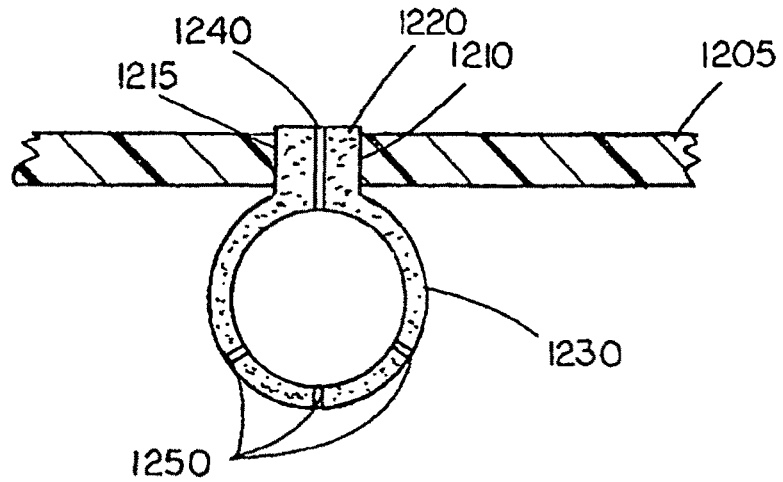

In additional preferred embodiments, an adhesive strip 1220 may provide for the sealing of a first edge 1210 and second edge 1215 of a base film 1205 by first directly connecting with both the first and second edges and then forming a secondary seal 1230 within the adhesive strip itself, as shown in FIGS. 21A, 21B, and 21C. The secondary seal 1230 may be formed in various different configurations. For instance, the secondary seal 1230 may place the first and second edges in near proximal relation to one another. Alternatively, the secondary seal 1230 may maintain a separation distance between the first and second edges. It is further contemplated that the separation distance of the first and second edges maintained by the secondary seal 1230 may vary in its dimensional characteristics. For example, portions of the first and second edges may be brought into closer proximity to one another at certain locations when compared to other locations along the adhesive strip 1220.

In the current embodiment, a plurality of micro-perforations 1240 contained within the adhesive strip 1220 may provide a primary seal that is ruptured by the increased pressure build up during cooking and the secondary seal 1230 may provide a second seal that is required to rupture before steam may be exhausted to an outer environment. Alternatively, the secondary seal 1230 may be allowed to rupture first during the cooking process followed by the exposure of the micro-perforations. It is contemplated that the secondary seal may include one or more micro-perforations 1250, as shown in FIG. 21B, and that these micro-perforations may vary in number and dimensional characteristics and may include various features as previously described.

It is contemplated that alternative packaging device configurations, such as that shown and described throughout the instant specification, may employ the micro-perforations within the adhesive as described without departing from the scope and spirit of the present invention. Further, the steam cooking properties of the packaging device employing the micro-perforations within the adhesive may arise from the use of structural variance within the base film. For instance, the section of the packaging device where the adhesive is being employed may be "thinned" or otherwise structurally degraded, such that upon cooking and the build up of pressure the adhesive is exposed at this specific section.

It is further contemplated that a packaging device similar to that shown in FIGS. 19A-21C may include one or more micro-perforations through the base film and thusly are not bonded by the adhesive. These micro-perforations may allow for the respiration of fresh food products as previously described.

Figure 22C:
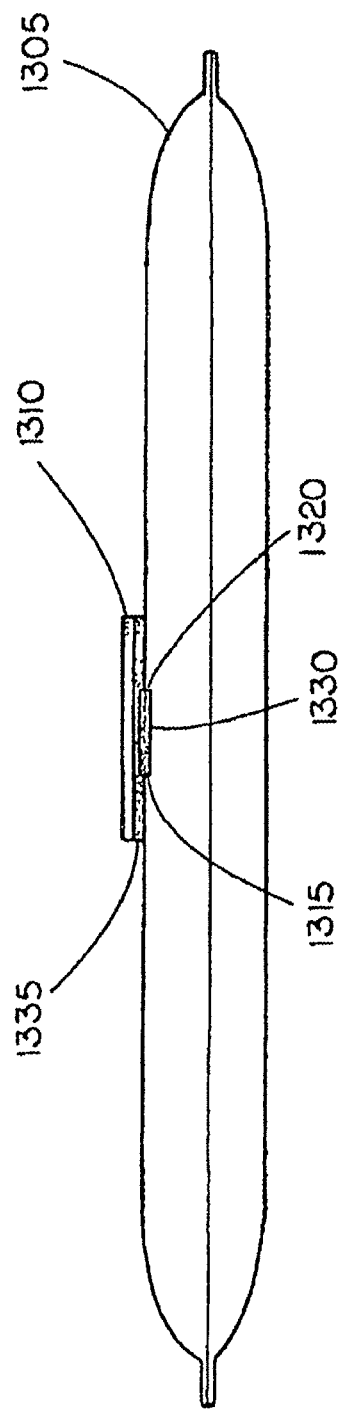

In another exemplary embodiment of a packaging device 1300, shown in FIGS. 22A, 22B, and 22C, a first base film 1305 may be sealed through the connection of a first edge 1315 and a second edge 1320 through the use of a seal, as previously described, forming a first adhesive strip 1330. A second base film 1310 may be sealed with the first base film 1305, generally located over the seal of the first and second edge of the first base film. A sealant, as previously described, may be utilized to connect the second base film with the first base film, forming a second adhesive strip 1335. It is contemplated that the first and second base films may or may not contain one or more micro-perforations that may allow for the respiration of a food product stored within, as previously described. It is further contemplated that the first adhesive strip and the second adhesive strip may or may not contain one or more micro-perforations, directed channels, and/or venting points as previously described.

During a cooking process the adhesive may structurally degrade allowing steam to vent through the micro-perforations contained in the base film. The venting system of micro-perforations contained within the adhesive allows the packaging device 1300 to retain its cooking properties. For example, the second base film may contain micro-perforations generally located proximal to the seals established by the adhesives. As the pressure builds during cooking both the adhesive seals may structurally degrade and expose the micro-perforations allowing the steam to vent. Alternatively, micro-perforations may be included within the adhesive. As previously described, each of the micro-perforations may be generally aligned with or not aligned with any other micro-perforations. Upon cooking and pressure build up, the micro-perforations are opened and the steam vents out of the packaging device.

The packaging device of the current invention may assume various alternative configurations that may allow the packaging device of the current invention to be utilized for storage, cooking and other purposes of other types of food products. As mentioned previously, an exemplary embodiment of the packaging device allows frozen food products to be contained within and receive the benefits of the packaging device as previously described. The various features and alternatives described for the exemplary embodiments of the packaging devices shown and described in FIGS. 1-9 may be employed for the exemplary embodiments of the packaging devices shown and described in FIGS. 10-22.

The venting system may be variously configured and employed within the exemplary embodiments described above. For instance, the venting system may be configured with a plurality of micro-perforations through an adhesive strip, multiple adhesive strips, a base film, multiple base films, and the like. It is further contemplated that slits or other alternative configurations of an opening that allows for the venting of steam during a cooking process and may be employed with the various exemplary packaging device embodiments described herein fall within the scope and spirit of the present invention.

It is to be understood, that the alternative configurations described above with respect to the packaging devices regarding the micro-perforations and the covering of all micro-perforations or less than all of the micro-perforations, whether the micro-perforations were included within the first base film, second base film, and/or adhesive strip (bonding agent), may be employed with all the various exemplary packaging device configurations shown and described throughout the instant application. Additional configurations for the coverage of the micro-perforations as may be contemplated by those of ordinary skill in the art may be employed without departing from the scope and spirit of the present invention.

In general, the packaging devices heretofore described have been constructed utilizing one film layer or two film layers. It is contemplated that any of the packaging devices described herein may utilize more than two film layers without departing from the scope and spirit of the present invention. It is further contemplated that the micro-perforations may be included within any film layer utilized in the construction of an exemplary packaging device of the current invention. While the material of the film layers has been described generally, it is contemplated that the construction of the packaging devices of the present invention may utilize material that has varying dimensional characteristics (i.e., thickness, length, width, and the like) and varying structural characteristics (i.e., various chemicals, compounds, and the like).

Figure 23:
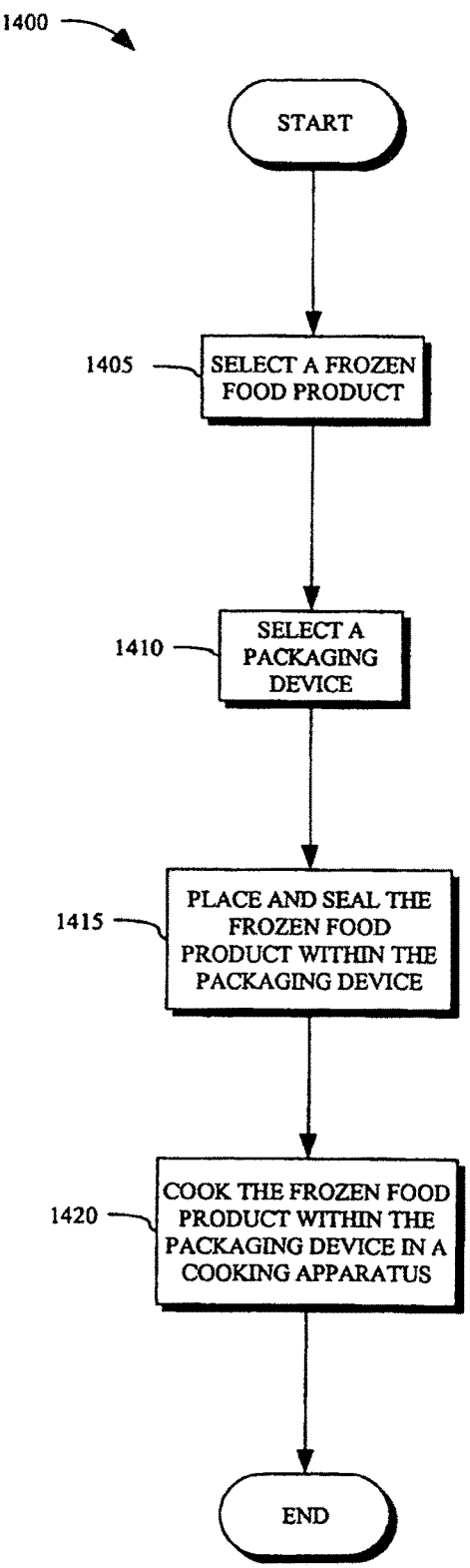
FIG. 23 is a block diagram illustration of a method of cooking a frozen food product using a packaging device including a venting system in accordance with an exemplary embodiment of the present invention.

Referring now to FIG. 23, a method 1400 of cooking a frozen food product is provided. In a first step 1405 a frozen food product is selected. The frozen food product may be one food product or a combination of food products. The frozen food product may further be selected from produce or meat food products without departing from the scope and spirit of the present invention. After the selection of the frozen food product, a packaging device including a venting system is selected in step 1410. The packaging device may be in accordance with any of the exemplary embodiments shown in previous drawing figures and described above. The packaging device may be selected on the type of frozen food product(s) or the weight of the food products may determine the packaging device and venting system selected. The selection of the packaging device may be further determined by the number of micro-perforations included in the venting system. For instance, a first bag may have a certain number and size of micro-perforations and it may be known that that number of micro-perforations at that size do or do not allow for the packaging device to provide a proper internal atmosphere for the type and weight of frozen food product selected. Therefore, that particular packaging device may or may not be selected. It may be the case that other considerations such as strength or rigidity of material may be a more important consideration. Other considerations as contemplated by those of ordinary skill in the art may be factored into the selection of the packaging device in the current method.

Once the packaging device is selected, in step 1415 the selected frozen food product(s) is placed within and the packaging device is sealed about the frozen food product(s). As described previously, the sealing of the packaging device may be through use of an integral seal, such as a heat sealing technique, or a re-sealable technology. It is to be understood that the packaging device may allow for expansion or contraction in its interior space in order to accommodate the storing and sealing about of the frozen food product within the interior space. The expansion or contraction capabilities may be provided through various systems, such as the stand-up pouch system and/or gusset system described previously. Other systems as contemplated by those of skill in the art may be employed without departing from the scope and spirit of the present invention.

With the frozen food product sealed within the packaging device, the packaging device is then placed in a cooking apparatus (i.e., microwave oven, convection oven, open flame grill, or the like) and cooked in step 1420. The cooking apparatus is heated and transfers that heat to the packaging device, which in turn transfers that heat to the perishable food product stored within. It is a particular advantage of the venting system (micro-perforations) included within the packaging device that they allow for the cooking of the frozen food product within the packaging device. The cooking time identifies the completion the cooking process for the frozen food product. Thus, the packaging device of the instant invention allows for the cooking of a frozen food product.

In an alternative embodiment, the current invention provides a method of cooking a food product that includes selecting a food product contained within a packaging device including a venting system contained within a base film. In a next step, the food product is cooked while contained within the packaging device. The venting system allows the release of pressure build-up during a cooking process. This method is applicable for both perishable and frozen food products depending on the construction of the packaging device.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof.

What is claimed is:

1. A microwavable food package, comprising:
an expandable first base film and an expandable second base film that are bonded or laminated together, wherein the expandable first and second base films are configured to form the microwavable food package having an inner surface which defines an interior space for storing and cooking food, and an outer surface which is in contact with an exterior environment, and wherein the interior space and the first and second base films expand in response to pressure buildup created by a microwave cooking process; and
a plurality of laser-formed microperforations that have a diameter of 1 to 500 microns, that extend from the interior space through the first base film and the second base film so as to be open prior to and during the microwave cooking process, that are arranged at a density of 1 to 50 microperforations per $cm^2$, that are located in proximity to the food, and that expand during the microwave cooking process;
a respiration system including at least some of the plurality of microperforations that are open prior to the microwave cooking process and that have a diameter configured to allow the transmission of gasses between the interior space and the exterior environment so that the interior space has an internal atmosphere including 2-18% $O_2$, 5-22% $CO_2$, and relative humidity of ≥70%, during at least a portion of the ripening, distribution, or storage processes of the food; and
a venting system including at least some of the microperforations of the respiration system and a weakened area formed in the first and/or second base film(s) around the at least some of the microperforations of the respiration system;
wherein the weakened area opens due to the pressure buildup in the interior space created by the microwave cooking process thereby controllably releasing the pressure buildup.

2. The microwavable food package of claim 1, wherein the pressure buildup in the interior space is initially released through the at least some of the microperforations of the respiration system that are included in the venting system.

3. The microwavable food package of claim 2, wherein the pressure buildup released by the at least some of the microperforations of the respiration system facilitates opening the weakened area.

4. The microwavable food package of claim 1, wherein the venting system further includes one or more additional laser-formed microperforations that are in addition to the microperforations in the respiration system, and that extend at least partially through the first and/or second base films near the weakened area.

5. The microwavable food package of claim 4, wherein the pressure buildup from the interior space passes through the one or more additional microperforations to further open the weakened area.

6. The microwavable food package of claim 5, wherein the one or more additional microperforations in the first and/or second base films exposes the interior space to the exterior environment upon the further opening of the weakened area.

7. The microwavable food package of claim 6, wherein the one or more additional microperforations controllably release the excess pressure buildup in the interior space during the microwave cooking process to provide a steam cooking function.

8. The microwavable food package of claim 1, wherein the respiration microperforations have a diameter of 1 to 200 microns.

9. The microwavable food package of claim 1, wherein the one or more additional microperforations have a diameter of 1 to 500 microns.

10. The microwavable food package of claim 1, wherein the venting system includes at least one of a slit, directed channel, barrier, venting point, or secondary seal.

11. A microwavable food package, comprising:
an expandable first base film and an expandable second base film that are bonded or laminated together, wherein the expandable first and second base films are configured to form the microwavable food package having an inner surface which defines an interior space for storing and cooking food, and an outer surface which is in contact with an exterior environment, and wherein the interior space and the first and second base films expand in response to pressure buildup created by a microwave cooking process; and
a plurality of laser-formed microperforations that have a diameter of 1 to 500 microns, that extend from the interior space through the first base film and the second base film so as to be open prior to and during the microwave cooking process, that are arranged at a density of 1 to 50 micro-perforations per $cm^2$, that are located in proximity to the food, and that expand during the microwave cooking process;

a respiration system including at least some of the plurality of microperforations that are open prior to the microwave cooking process and that have a diameter configured to allow the transmission of gasses between the interior space and the exterior environment so that the interior space has an internal atmosphere including 2-18% $O_2$, 5-22% $CO_2$, and relative humidity of $\geq 70\%$, during at least a portion of the ripening, distribution, or storage processes of the food; and a venting system including at least some of the microperforations of the respiration system and a weakened area formed in the first and/or second base film(s) around the at least some of the microperforations of the respiration system;

wherein the pressure buildup in the interior space is initially released through the at least some of the microperforations of the respiration system that are included in the venting system; and wherein the weakened area opens due to the pressure buildup in the interior space created by the microwave cooking process, thereby controllably releasing the pressure buildup.

12. The microwavable food package of claim 11, wherein the venting system further includes one or more additional laser-formed microperforations that are in addition to the microperforations in the respiration system, and that extend at least partially through the first and/or second base films near the weakened area.

13. The microwavable food package of claim 12, wherein the pressure buildup from the interior space passes through the one or more additional microperforations to further open the weakened area.

14. The microwavable food package of claim 13, wherein the one or more additional microperforations in the first and/or second base films exposes the interior space to the exterior environment upon the further opening of the weakened area.

15. The microwavable food package of claim 14, wherein the one or more additional microperforations controllably release the pressure buildup in the interior space during the microwave cooking process to provide a steam cooking function.

16. The microwavable food package of claim 11, wherein the respiration microperforations have a diameter of 1 to 200 microns.

17. The microwavable food package of claim 11, wherein the one or more additional microperforations have a diameter of 1 to 500 microns.

18. The microwavable food package of claim 11, wherein the venting system includes at least one of a slit, directed channel, barrier, venting point, or secondary seal.

19. A microwavable food package, comprising:

an expandable first base film and an expandable second base film that are bonded or laminated together, wherein the expandable first and second base films are configured to form the microwavable food package having an inner surface which defines an interior space for storing and cooking food, and an outer surface which is in contact with an exterior environment, and wherein the interior space and the first and second base films expand in response to pressure buildup created by a microwave cooking process;

a respiration system including plurality of laser-formed microperforations that have a diameter of 1 to 200 microns, that extend from the interior space through the first base film and the second base film so as to be open prior to and during the microwave cooking process, that are arranged at a density of 1 to 50 microperforations per $cm^2$, that are located in proximity to the food, that are configured to allow the transmission of gasses between the interior space and the exterior environment so that the interior space has an internal atmosphere including 2-18% $O_2$, 5-22% $CO_2$, and relative humidity of $\geq 70\%$, during at least a portion of the ripening, distribution, or storage processes of the food, and that expand during the microwave cooking process; and a venting system including at least some of the microperforations of the respiration system, a weakened area formed in the first and/or second base film(s) around the at least some of the microperforations of the respiration system, and one or more additional laser-formed microperforations that are in addition to the microperforations in the respiration system, and that extend at least partially through the first and/or second base films near the weakened area;

wherein the pressure build up in the interior space is initially released through the at least some of the microperforations of the respiration system that are included in the venting system;

wherein the weakened area opens due to the pressure buildup in the interior space created by the microwave cooking process to open the one or more additional microperforations;

wherein the one or more additional microperforations in the first and/or second base films further exposes the interior space to the exterior environment; and wherein the one or more additional microperforations controllably release the pressure buildup in the interior space during the microwave cooking process to provide a steam cooking function.

20. The microwavable food package of claim 19, wherein the venting system includes at least one of a slit, directed channel, barrier, venting point, or secondary seal.

* * * * *